(12) United States Patent
Varcoe et al.

(10) Patent No.: US 10,009,175 B2
(45) Date of Patent: Jun. 26, 2018

(54) SECURE COMMUNICATION

(71) Applicant: University of Leeds, Leeds, Yorkshire (GB)

(72) Inventors: Benjamin Thomas Hornsby Varcoe, Leeds (GB); Matthew Christopher John Everitt, Leeds (GB)

(73) Assignee: The University of Leeds, Leeds (GB)

( * ) Notice: Subject to any disclaimer, the term of this patent is extended or adjusted under 35 U.S.C. 154(b) by 0 days. days.

(21) Appl. No.: 14/403,144

(22) PCT Filed: May 23, 2013

(86) PCT No.: PCT/GB2013/051361
§ 371 (c)(1),
(2) Date: Nov. 21, 2014

(87) PCT Pub. No.: WO2013/175224
PCT Pub. Date: Nov. 28, 2013

(65) Prior Publication Data
US 2015/0134947 A1  May 14, 2015

(30) Foreign Application Priority Data

May 23, 2012 (GB) .................................. 1209286.2
May 23, 2012 (GB) .................................. 1209308.4

(51) Int. Cl.
*H04L 9/00* (2006.01)
*H04L 9/08* (2006.01)

(52) U.S. Cl.
CPC .......... *H04L 9/0852* (2013.01); *H04L 9/0858* (2013.01); *H04L 9/0838* (2013.01)

(58) Field of Classification Search
CPC .... H04L 9/0852; H04L 9/0858; H04L 9/0838
See application file for complete search history.

(56) References Cited

U.S. PATENT DOCUMENTS 2,620,981 A * 12/1952 Brown .................... H03M 1/00
                                                          235/103
5,515,438 A *  5/1996 Bennett ................. H04L 9/0858
                                                          380/256

(Continued)

FOREIGN PATENT DOCUMENTS

CN       101227270       7/2008
EP         0735723      10/1996

(Continued)

OTHER PUBLICATIONS

Hoi-Kwong Lo and Norbert Lutkenhaus, Quantum Cryptography: From Theory to Practice (Feb. 1, 2008) (available at http://arxiv.org/pdf/quant-ph/0702202.pdf).*

(Continued)

*Primary Examiner* — Sharon Lynch
(74) *Attorney, Agent, or Firm* — Klarquist Sparkman, LLP

(57) ABSTRACT

A method for allowing a first party and a second party to obtain shared secret information is provided. The method comprises the steps of: obtaining, by the first party, a sequence of values $A=X+N^A$ where X is a sequence of values and $N^A$ is a random sequence associated with the first party; obtaining, by the second party, a sequence of values $B=X+N^B$ where $N^B$ is a random sequence associated with the second party; performing, by the first and second parties, a data matching procedure to identify corresponding pairs of values, a, b, in respective sequences A and B that match, wherein sequences A and B are discrete-valued sequences equal to, derived from, or derived using, sequences A and B; wherein the shared secret information is equal to, or derived from, or derived using, the matching values in sequences A and B.

27 Claims, 15 Drawing Sheets

(56) References Cited

U.S. PATENT DOCUMENTS

| | | | | |
|---|---|---|---|---|
| 7,284,024 | B1* | 10/2007 | Trifonov | B82Y 10/00 |
| | | | | 708/256 |
| 7,333,611 | B1* | 2/2008 | Yuen | H04B 10/70 |
| | | | | 380/256 |
| 7,403,623 | B2* | 7/2008 | Cerf | H04L 9/0858 |
| | | | | 359/238 |
| 7,609,839 | B2* | 10/2009 | Watanabe | H04L 9/0858 |
| | | | | 380/255 |
| 7,616,765 | B2* | 11/2009 | Maeda | H04L 9/0852 |
| | | | | 380/255 |
| 7,627,126 | B1* | 12/2009 | Pikalo | H04L 9/0858 |
| | | | | 356/473 |
| 7,697,687 | B2* | 4/2010 | Liang | H04L 9/12 |
| | | | | 380/255 |
| 7,831,049 | B1* | 11/2010 | Kanter | H04K 1/006 |
| | | | | 380/256 |
| 8,238,551 | B2* | 8/2012 | Reznik | H04K 1/00 |
| | | | | 380/44 |
| 8,315,387 | B2* | 11/2012 | Kanter | H04L 9/0852 |
| | | | | 380/256 |
| 8,391,491 | B2* | 3/2013 | Tanaka | H04L 9/0852 |
| | | | | 380/274 |
| 8,503,673 | B2* | 8/2013 | Patwari | H04L 63/06 |
| | | | | 380/44 |
| 8,515,058 | B1* | 8/2013 | Gentry | H04L 9/008 |
| | | | | 380/28 |
| 2001/0038695 | A1 | 11/2001 | Kim | |
| 2003/0063751 | A1* | 4/2003 | Bruen | H04L 9/0838 |
| | | | | 380/278 |
| 2004/0109564 | A1* | 6/2004 | Cerf | H04L 9/0858 |
| | | | | 380/256 |
| 2004/0126093 | A1* | 7/2004 | Platt | H04L 63/045 |
| | | | | 386/230 |
| 2005/0036624 | A1* | 2/2005 | Kent | H04L 9/0858 |
| | | | | 380/277 |
| 2005/0152540 | A1 | 7/2005 | Barbosa | |
| 2005/0160316 | A1* | 7/2005 | Shipton | B41J 2/04505 |
| | | | | 714/22 |
| 2006/0093143 | A1* | 5/2006 | Maeda | H04L 9/0852 |
| | | | | 380/256 |
| 2007/0058810 | A1* | 3/2007 | Tanaka | H04L 9/0852 |
| | | | | 380/210 |
| 2007/0165845 | A1* | 7/2007 | Ye | H04L 63/061 |
| | | | | 380/30 |
| 2007/0230688 | A1* | 10/2007 | Tajima | H04L 9/0891 |
| | | | | 380/30 |
| 2008/0147820 | A1* | 6/2008 | Maeda | H04L 9/0858 |
| | | | | 709/213 |
| 2008/0185434 | A1 | 8/2008 | Chabanne | |
| 2009/0113267 | A1* | 4/2009 | Harrison | H03M 13/1108 |
| | | | | 714/746 |
| 2009/0169015 | A1* | 7/2009 | Watanabe | H04L 9/0858 |
| | | | | 380/278 |
| 2009/0268901 | A1* | 10/2009 | Lodewyck | H04L 9/0852 |
| | | | | 380/41 |
| 2009/0279700 | A1 | 11/2009 | Ye et al. | |
| 2009/0323955 | A1 | 12/2009 | Ikushima et al. | |
| 2010/0138719 | A1* | 6/2010 | Lee | H03M 13/1102 |
| | | | | 714/752 |
| 2010/0174897 | A1* | 7/2010 | Schumacher | H04L 9/0656 |
| | | | | 713/150 |
| 2010/0257434 | A1* | 10/2010 | Harrison | H03M 13/11 |
| | | | | 714/785 |
| 2010/0293380 | A1* | 11/2010 | Wiseman | H04L 9/0852 |
| | | | | 713/169 |
| 2011/0311050 | A1* | 12/2011 | Tomaru | H04B 10/70 |
| | | | | 380/256 |
| 2012/0045053 | A1 | 2/2012 | Qi et al. | |
| 2012/0140922 | A1* | 6/2012 | Annavajjala | H04L 9/0875 |
| | | | | 380/44 |
| 2012/0237031 | A1* | 9/2012 | Donnangelo | H04L 1/0009 |
| | | | | 380/256 |
| 2013/0163759 | A1* | 6/2013 | Harrison | H04L 9/0819 |
| | | | | 380/268 |

FOREIGN PATENT DOCUMENTS

| | | |
|---|---|---|
| JP | 2008-070636 | 3/2008 |
| JP | 2011-520405 | 4/2011 |
| WO | WO 2009140228 | 11/2009 |

OTHER PUBLICATIONS

STIC search strategy for 14403144 (Conducted Jun. 2, 2017).*

Search Report from the United Kingdom Intellectual Property Office for corresponding Great Britain Application No. GB1209286.2, dated Mar. 13, 2013, 3 pages.

International Search Report and Written Opinion of the International Searching Authority, dated Oct. 16, 2013, for corresponding International Application No. PCT/GB2013/051361, 25 pages.

International Preliminary Report on Patentability and Written Opinion of the International Searching Authority, dated Dec. 4, 2014, for corresponding International Application No. PCT/GB2013/051361, 19 pages.

Cachin et al., "Linking Information Reconciliation and Privacy Amplification," *J. Cryptology*, vol. 10, No. 2, pp. 97-110, Mar. 1, 1997.

Ueli M. Maurer, "Secret Key Agreement by Public Discussion from Common Information," *IEEE Transactions on Information Theory*, IEEE Press, vol. 39, No. 3, pp. 733-742, May 1, 1993.

Su et al., "An Efficient and Secured Internet Key Exchange Protocol Design," Fifth Annual Conference on Communication Networks and Services Research, IEEE, pp. 184-192, May 1, 2007.

First Office Action (w/English translation) received in Chinese Patent Application No. 201380035492.1, dated Jan. 24, 2017, 18 pages.

Office Action received in counterpart European Application No. 13725454.6 dated Jan. 19, 2018, 6 pages.

Wallace, "Secure Physical Layer Key Generation Schemes: Performance and Information Theoretic Limits," *Proceedings of the 2009 IEEE International Conference on Communications, ICC'09*, Piscataway, New Jersey, pp. 943-947, 5 pages.

Yoshimura et al., "Secure devices distribution using correlated randomness in optical devices," (English Abstract) *IEICE Technical Report*, The Institute of Electronics, Information and Communication Engineers, Nov. 9-11, 2011, pp. 81-84, 7 pages.

Yoshimura et al., "Secure key distribution using correlated randomness in lasers driven by common random light," *Physical Review Letters, PRL 108*, Feb. 17, 2012, 8 pages.

Examination Report received in Australia Application No. 2013265020, dated Mar. 31, 2017, 4 pages.

Second Office Action (w/English translation) received in Chinese Application No. 201380035492.1, dated Aug. 28, 2017, 15 pages.

Office Action (w/partial English translation) received in Japanese Application No. 2015-513272, dated Feb. 7, 2017, 17 pages.

Partial International Search Report, received in PCT/GB2013/051361, dated Aug. 5, 2013, 10 pages.

Muramatsu et al., "Secret Key Capacity for Optimally Correlated Sources Under Sampling Attack," IEEE Transactions of Information Theory, Nov. 2006, vol. 52, No. 11, pp. 5140-5151, 13 pages.

Varcoe, "Channel Independent Cryptographic Key Distribution," submitted to *IEEE Transactions on Information Theory*, available at https://arxiv.org/abs/1211.4976v1, Nov. 21, 2012, 7 pages.

Varcoe, "Channel Independent Cryptographic Key Distribution," available at http://arxiv.org/abs/1211.4976, revised Dec. 3, 2012, 5 pages.

* cited by examiner

SECURE COMMUNICATION

CROSS REFERENCE TO RELATED APPLICATIONS

This is the U.S. National Stage of International Application No. PCT/GB2013/051361, filed May 23, 2013, which in turn claims priority to and the benefit of United Kingdom Application Nos. GB1209286.2, filed May 23, 2012 and GB1209308.4, filed May 23, 2012.

FIELD OF THE INVENTION

The present invention relates to secure communication, and more particularly, though not exclusively, to unconditionally secure communication using quantum mechanical and/or classical communication channels.

BACKGROUND OF THE INVENTION

A fundamental problem in communication theory is how to transmit a message, M, between two parties without a third party also being able to obtain the message. For example, in the field of electronic financial transactions, it is very important to maintain secrecy in the communication between two parties.

Conventionally, the two parties who wish to exchange a message are known respectively as Alice and Bob, while an eavesdropper who wishes to gain unauthorised access to the message M is known as Eve.

Many communication techniques have been developed to solve this problem. One class of techniques relies on the computational limitations of Eve that prevent her from performing certain mathematical operations in a reasonable time. For example the security of the RSA public key cryptographic technique relies heavily on the computational difficulty in factoring very large integers. Techniques of this type are known as "conditionally secure" or "computationally secure".

One problem with conditionally secure techniques is that confidence in their security relies on mathematical results in the field of complexity theory that remain unproven. Therefore, it cannot, at present, be certain that such techniques will not be broken in the future, using only the resources of a classical computer, if appropriate mathematical tools for doing so can be developed. Furthermore, the development of quantum computational techniques renders conditionally secure techniques vulnerable due to the potential ability of quantum computers to perform certain mathematical operations, including operations on which computationally secure techniques rely, much faster than a classical computer.

Therefore, there has been a great deal of interest in the development of a class of communication techniques that makes no assumptions about the computing power of Eve. Techniques of this type are known as "unconditionally secure".

One example of an unconditionally secure data transmission scheme is known as the "one-time pad". According to this technique, Alice bitwise modulo-2 adds (i.e. XORs) a binary plaintext string (the message M) and a secret random binary string (the one-time pad) having the same length as the message. The resulting binary ciphertext string (the enciphered message $M^e$) is transmitted to Bob instead of the original message M. To recover the original message M, Bob bitwise modulo-2 adds a local copy of the one-time pad to the received enciphered message $M^e$. Even if Eve intercepts the transmitted enciphered message $M^e$, it is impossible for Eve to recover the original message M without knowledge of the one-time pad. As suggested by the name, the one-time pad is used only once to help preserve security.

A fundamental requirement of any secure communication scheme is that Alice and/or Bob must possess some kind of secret information that is unknown to Eve. This secret information is used as the basis of the encryption and/or subsequent decryption of a message. In some schemes, it is necessary for both Alice and Bob to possess at least some secret information that is at least partially shared between them. For example, the secret information may be in the form of the random binary string in the one-time pad scheme described above. In this case, the secret information is fully shared between Alice and Bob.

One problem with any secure communication technique requiring shared secret information is how to distribute the secret information between Alice and Bob without it becoming known to Eve. This problem can be especially acute in the case of techniques such as the one-time pad, in which the amount of secret information required is comparable to the amount of plaintext message data. Therefore, what is desired is a technique that allows Alice and Bob to obtain shared secret information, and in particular, to obtain this information in an unconditionally secure manner.

As described above, shared secret information is first distributed between Alice and Bob using a first mechanism, and then Alice and Bob use a second mechanism involving the shared secret information to exchange a message. One reason why this two-stage approach is used, rather than to simply directly exchange the message using the first mechanism, is that mechanisms suitable for allowing Alice and Bob to obtain shared secret information without prior shared information may be unsuitable or impractical for message exchange in some cases. For example, some mechanisms allow Alice and Bob to obtain shared secret information, but do not allow Alice and Bob to control the exact content of the shared secret information.

SUMMARY OF THE INVENTION

It is an aim of certain exemplary embodiments of the invention to solve, mitigate or obviate, at least partly, at least one of the problems and/or disadvantages associated with the related art, for example at least one of the problems and/or disadvantages described above. Certain embodiments of the invention aim to provide at least one advantage over the related art, for example at least one of the advantages described below.

The invention is defined by the independent claims to which reference is now directed. Advantageous features are defined by the dependent claims.

In accordance with various aspects of the present invention, there is provided a method, apparatus and/or system in accordance with any one of the claims of the present specification, or in accordance with any of the aspects disclosed herein.

Another aspect of the present invention provides a computer program comprising instructions arranged, when executed, to implement a method, system and/or apparatus in accordance with any one of the claims of the present specification, or in accordance with any of the aspects disclosed herein. A further aspect provides machine-readable storage storing such a program.

In accordance with an aspect of the present invention, there is provided a method for allowing a first party and a second party to obtain shared secret information, the method comprising the steps of: obtaining, by the first party, a sequence of values $A=X+N^A$ where X is a sequence of values and $N^A$ is a random sequence associated with the first party; obtaining, by the second party, a sequence of values $B=X+N^B$ where $N^B$ is a random sequence associated with the second party; performing, by the first and second parties, a data matching procedure to identify corresponding pairs of values, $\underline{a}_i$, $\underline{b}_i$, in respective sequences $\underline{A}$ and $\underline{B}$, that match, wherein sequences $\underline{A}$ and $\underline{B}$ are discrete-valued sequences equal to, derived from, or derived using, sequences A and B; wherein the shared secret information is equal to, or derived from, or derived using, the matching values in sequences $\underline{A}$ and $\underline{B}$.

In accordance with a further aspect of the present invention, there is provided a method for a first party, for allowing the first party and a second party to obtain shared secret information, the method comprising the steps of: obtaining, by the first party, a sequence of values $A=X+N^A$ where X is a sequence of values and $N^A$ is a random sequence associated with the first party; performing, by the first party, by exchanging messages between the first party and the second party, a data matching procedure to identify corresponding pairs of values, $\underline{a}_i$, $\underline{b}_i$, in respective sequences $\underline{A}$ and $\underline{B}$, that match, where B is a sequence of values $B=X+N^B$ obtained by the second party, $N^B$ is a random sequence associated with the second party, and sequences $\underline{A}$ and $\underline{B}$ are discrete-valued sequences equal to, derived from, or derived using, sequences A and B; wherein the shared secret information is equal to, derived from, or derived using, the matching values in sequences $\underline{A}$ and $\underline{B}$.

In accordance with a further aspect of the present invention, there is provided a method for a second party, for allowing a first party and the second party to obtain shared secret information, the method comprising the steps of: obtaining, by the second party, a sequence of values $B=X+N^B$ where X is a sequence of values and $N^B$ is a random sequence associated with the second party; performing, by the second party, by exchanging messages between the first party and the second party, a data matching procedure to identify corresponding pairs of values, $\underline{a}_i$, $\underline{b}_i$ in respective sequences $\underline{A}$ and $\underline{B}$, that match, where B is a sequence of values $A=X+N^A$ obtained by the first party, $N^A$ is a random sequence associated with the first party, and sequences $\underline{A}$ and $\underline{B}$ are discrete-valued sequences equal to, derived from, or derived using, sequences A and B; wherein the shared secret information is equal to, derived from, or derived using, the matching values in sequences $\underline{A}$ and $\underline{B}$.

In accordance with a further aspect of the present invention, there is provided a computer program comprising instructions arranged, when executed, to implement a method for allowing a first party and a second party to obtain shared secret information, the method comprising the steps of: obtaining, by the first party, a sequence of values $A=X+N^A$ where X is a sequence of values and $N^A$ is a random sequence associated with the first party; obtaining, by the second party, a sequence of values $B=X+N^B$ where $N^B$ is a random sequence associated with the second party; performing, by the first and second parties, a data matching procedure to identify corresponding pairs of values, $\underline{a}_i$, $\underline{b}_i$ in respective sequences $\underline{A}$ and $\underline{B}$, that match, wherein sequences $\underline{A}$ and $\underline{B}$ are discrete-valued sequences equal to, derived from, or derived using, sequences A and B; wherein the shared secret information is equal to, or derived from, or derived using, the matching values in sequences $\underline{A}$ and $\underline{B}$.

In accordance with a further aspect of the present invention, there is provided a computer program comprising instructions arranged, when executed, to implement a method for a first party, for allowing the first party and a second party to obtain shared secret information, the method comprising the steps of: obtaining, by the first party, a sequence of values $A=X+N^A$ where X is a sequence of values and $N^A$ is a random sequence associated with the first party; performing, by the first party, by exchanging messages between the first party and the second party, a data matching procedure to identify corresponding pairs of values, $\underline{a}_i$, $\underline{b}_i$ in respective sequences $\underline{A}$ and $\underline{B}$, that match, where B is a sequence of values $B=X+N^B$ obtained by the second party, $N^B$ is a random sequence associated with the second party, and sequences $\underline{A}$ and $\underline{B}$ are discrete-valued sequences equal to, derived from, or derived using, sequences A and B; wherein the shared secret information is equal to, derived from, or derived using, the matching values in sequences $\underline{A}$ and $\underline{B}$.

In accordance with a further aspect of the present invention, there is provided a computer program comprising instructions arranged, when executed, to implement a method for a second party, for allowing a first party and the second party to obtain shared secret information, the method comprising the steps of: obtaining, by the second party, a sequence of values $B=X+N^B$ where X is a sequence of values and $N^B$ is a random sequence associated with the second party; performing, by the second party, by exchanging messages between the first party and the second party, a data matching procedure to identify corresponding pairs of values, $\underline{a}_i$, $\underline{b}_i$ in respective sequences $\underline{A}$ and $\underline{B}$, that match, where B is a sequence of values $A=X+N^A$ obtained by the first party, $N^A$ is a random sequence associated with the first party, and sequences $\underline{A}$ and $\underline{B}$ are discrete-valued sequences equal to, derived from, or derived using, sequences A and B; wherein the shared secret information is equal to, derived from, or derived using, the matching values in sequences $\underline{A}$ and $\underline{B}$.

In accordance with a further aspect of the present invention, there is provided a system for allowing a first party and a second party to obtain shared secret information, the system comprising: a first apparatus of the first party, for obtaining a sequence of values $A=X+N^A$ where X is a sequence of values and $N^A$ is a random sequence associated with the first party; a second apparatus of the second party, for obtaining a sequence of values $B=X+N^B$ where $N^B$ is a random sequence associated with the second party; wherein the first and second apparatus are configured to perform a data matching procedure to identify corresponding pairs of values, $\underline{a}_i$, $\underline{b}_i$ in respective sequences $\underline{A}$ and $\underline{B}$, that match, wherein sequences $\underline{A}$ and $\underline{B}$ are discrete-valued sequences equal to, derived from, or derived using, sequences A and B; wherein the shared secret information is equal to, derived from, or derived using, the matching values in sequences $\underline{A}$ and $\underline{B}$.

In accordance with a further aspect of the present invention, there is provided an apparatus for allowing a first party and a second party to obtain shared secret information, the apparatus comprising: a unit for obtaining, by the first party, a sequence of values $A=X+N^A$ where X is a sequence of values and $N^A$ is a random sequence associated with the first party; a processor for performing, by the first party, by exchanging messages between the first party and the second party, a data matching procedure to identify corresponding pairs of values, $\underline{a}_i$, $\underline{b}_i$ in respective sequences $\underline{A}$ and $\underline{B}$, that match, where B is a sequence of values $B=X+N^B$ obtained by the second party, $N^B$ is a random sequence associated with the second party, and sequences $\underline{A}$ and $\underline{B}$ are discrete-valued sequences equal to, derived from, or derived using, sequences $\underline{A}$ and $\underline{B}$; wherein the shared secret information is equal to, derived from, or derived using, the matching values in sequences $\underline{A}$ and $\underline{B}$.

In accordance with a further aspect of the present invention, there is provided an apparatus for allowing a first party and a second party to obtain shared secret information, the apparatus comprising: a unit for obtaining, by the second party, a sequence of values $B=X+N^B$ where X is a sequence of values and $N^B$ is a random sequence associated with the second party; a processor for performing, by the second party, by exchanging messages between the first party and the second party, a data matching procedure to identify corresponding pairs of values, $\underline{a_i}$, $\underline{b_i}$ in respective sequences $\underline{A}$ and $\underline{B}$, that match, where A is a sequence of values $A=X+N^A$ obtained by the first party, $N^A$ is a random sequence associated with the first party, and sequences $\underline{A}$ and $\underline{B}$ are discrete-valued sequences equal to, derived from, or derived using, sequences A and B; wherein the shared secret information is equal to, derived from, or derived using, the matching values in sequences $\underline{A}$ and $\underline{B}$.

In an exemplary embodiment according to any of the above-described aspects, the data matching procedure comprises the steps of: exchanging one or more messages between the first party and the second party, such that at least one of the first party and the second party acquires one or more values, wherein at least one of the acquired values is equal to or derived from $\underline{a_i}$, and at least one of the acquired values is equal to or derived from $\underline{b_i}$; and performing, by at least one of the first party and the second party, one or more mathematical operations including a comparison operation, wherein matching of the values $\underline{a_i}$ and $\underline{b_i}$ is determined from the result of the comparison.

In an exemplary embodiment according to any of the above-described aspects, the data matching procedure comprises performing, by a party P being one of the first party and the second party, and a party Q being the other of the first party and the second party, the steps of: transmitting, by party P to party Q, a value $T_1=f_1(p)$, where p is a value in the sequence of party P and $f_1$ is a predetermined function; comparing, by party Q, $T_1$ or a value derived from $T_1$ with q or a value derived from q, where q is a value in the sequence of party Q corresponding in sequence position to p.

In an exemplary embodiment according to any of the above-described aspects, the step of comparing comprises at least one of: comparing $T_1$ with $f_1(q)$; and comparing $f^{-1}_1(T_1)$ with q, where $f^{-1}_1$ is the inverse function of $f_1$.

In an exemplary embodiment according to any of the above-described aspects, $f_1$ is a hash function.

In an exemplary embodiment according to any of the above-described aspects, the data matching procedure comprises performing, by a party P being one of the first party and the second party, and a party Q being the other of the first party and the second party, the steps of: transmitting, by party P to party Q, a value $T_1=f_1(p)$, where p is a value in the sequence of party P and $f_1$ is a predetermined function; and computing, by party Q, a value $T_2=f_2(T_1,q)$ where $f_2$ is a predetermined function and q is a value in the sequence of party Q corresponding in sequence position to p; wherein the step of comparing comprises comparing, by at least one of the first party and the second party, $T_2$ with a predetermined value.

In an exemplary embodiment according to any of the above-described aspects, $f_1(p)=p\oplus r$, where r is a random value and $\oplus$ denotes modulo-2 addition.

An exemplary embodiment according to any of the above-described aspects comprises the further step of transmitting, by party P to party Q, a value $T_3=f_3(r)$, where $f_3$ is a predetermined function; wherein $T_2=T_1\oplus q$, and wherein the step of comparing comprises comparing, by party Q, $T_3$ with $H(T_2)$.

An exemplary embodiment according to any of the above-described aspects comprises the further step of transmitting, by party Q to party P, the value $T_2=f_3(T_1\oplus q)$, where $f_3$ is a predetermined function; and wherein the step of comparing comprises comparing, by party P, $f_3(r)$ with $T_2$.

In an exemplary embodiment according to any of the above-described aspects, $f_3$ is a hash function.

In an exemplary embodiment according to any of the above-described aspects, the data matching procedure comprises performing, by a party P being one of the first party and the second party, and a party Q being the other of the first party and the second party, the steps of: computing, by party P, a bit value $m_1=p_1\oplus r$, where $p_1$ is a first bit of a value p in the sequence of party P, r is a random bit, and $\oplus$ denotes modulo-2 addition; computing, by party P, a bit value $m_2=p_2\oplus r$, where $p_2$ is a second bit of p; transmitting, by party P to party Q, the bit values $m_1$ and $m_2$; computing, by party Q, a bit value $m'_1=m_1\oplus q_1$ where $q_1$ is a first bit, corresponding in bit position to $p_1$, of a value q in the sequence of party Q corresponding in sequence position to p; computing, by party Q, a bit value $m'_2=m_2\oplus q_2$ where $q_2$ is a second bit of q, corresponding in bit position to $p_2$; comparing a value $m'_1\oplus m'_2$ with 0.

In an exemplary embodiment according to any of the above-described aspects, the step of performing the data matching procedure comprises the step of, for each pair of corresponding error-processed values, $\underline{a_i}$, $\underline{b_i}$ in sequences $\underline{A}$ and $\underline{B}$, performing, by a party P being one of the first and second parties, and a party Q being the other of the first and second parties, the sub-steps of: generating, by party P, a first combined value by combining the value $\underline{a_i}/\underline{b_i}$ of the sequence $\underline{A}/\underline{B}$ corresponding to party P with a random value using a self-inverse operation; transmitting, by party P, the first combined value to party Q; generating, by party Q, a second combined value by combining the first combined value with the value $\underline{b_i}/\underline{a_i}$ of the sequence $\underline{B}/\underline{A}$ corresponding to party Q using the self-inverse operation; generating, by party Q, a first hash value of the second combined value; transmitting, by party Q the first hash value to party P; generating, by party P, a second hash value of the random value; comparing, by party P, the first hash value and the second hash value; transmitting, by party P, a match signal according to the result of the comparison; retaining, by party P and party Q, only those values in sequences $\underline{A}$ and $\underline{B}$ that match as indicated by the match signal.

In an exemplary embodiment according to any of the above-described aspects, the self-inverse operation is modulo-2 addition, and the random value is a random binary value having the same size as the values $\underline{a_i}/\underline{b_i}$.

In an exemplary embodiment according to any of the above-described aspects, a hash value comprises fewer bits than the value from which the hash value is computed.

In an exemplary embodiment according to any of the above-described aspects, the data matching procedure uses a sequence of random values r, corresponding respectively to pairs of values, $\underline{a_i}$, $\underline{b_i}$, in respective sequences $\underline{A}$ and $\underline{B}$, and wherein the shared secret information is based on the random values corresponding to matching values $\underline{a_i}$, $\underline{b_i}$ in sequences $\underline{A}$ and $\underline{B}$.

In an exemplary embodiment according to any of the above-described aspects, the data matching procedure comprises at least one of reconciliation and reverse-reconciliation.

An exemplary embodiment according to any of the above-described aspects comprises the further step of encoding the sequence X into a signal and transmitting the signal.

In an exemplary embodiment according to any of the above-described aspects, the values of the sequence X are encoded into the quantum states of the signal transmitted by the first party.

In an exemplary embodiment according to any of the above-described aspects, the values of the sequence X are encoded into at least one of: an amplitude; and a phase of the signal.

In an exemplary embodiment according to any of the above-described aspects, the signal encoding the sequence X is a microwave signal.

In an exemplary embodiment according to any of the above-described aspects, the encoded signal is encoded and transmitted by the first party.

In an exemplary embodiment according to any of the above-described aspects, the encoded signal is encoded and transmitted by a party other than the first and second parties.

In an exemplary embodiment according to any of the above-described aspects, the step of obtaining, by the second party, the sequence B comprises the step of receiving, by the second party, the encoded signal, and detecting, by the second party, the encoded values.

In an exemplary embodiment according to any of the above-described aspects, the step of obtaining, by the first party, the sequence of values A comprises receiving, by the first party, the encoded signal, and detecting, by the first party, the encoded values.

In an exemplary embodiment according to any of the above-described aspects, $N^B$ comprises detector noise associated with a detector of the second party, and $N^A$ comprises detector noise associated with a detector of the first party.

In an exemplary embodiment according to any of the above-described aspects, the sequence X comprises a random sequence of values.

In an exemplary embodiment according to any of the above-described aspects, the sequence X comprises a sequence of Gaussian distributed values.

In an exemplary embodiment according to any of the above-described aspects, the sequence X comprises a predetermined sequence of values.

In an exemplary embodiment according to any of the above-described aspects, the values of sequence X are continuous-valued.

An exemplary embodiment according to any of the above-described aspects comprises the further step of converting, by each of the first and second parties, the respective sequences A and B into corresponding discrete-valued sequences $\underline{A}$ and $\underline{B}$.

In an exemplary embodiment according to any of the above-described aspects, the step of converting the sequences A and B into corresponding discrete-valued sequences $\underline{A}$ and $\underline{B}$ comprises the step of: obtaining, by each of the first and second parties, a respective sequence of binary values, $\underline{A}$ and $\underline{B}$, corresponding respectively to A and B, by applying a predetermined discretisation operation to each continuous value, $a_i$, $b_i$, in sequences A and B to obtain a corresponding binary value in sequences $\underline{A}$ and $\underline{B}$, wherein the discretisation operation maps ranges of continuous values to corresponding binary values.

In an exemplary embodiment according to any of the above-described aspects, the step of converting the sequences A and B into corresponding discrete-valued sequences $\underline{A}$ and $\underline{B}$ comprises data slicing.

In an exemplary embodiment according to any of the above-described aspects, the data slicing is performed based on the following equation:

$$S_i(x) = \begin{cases} 0 & \text{if } \tau_{2^i n} \leq x < \tau_{2^i n + 2^{i}-1} \\ 1 & \text{otherwise} \end{cases}$$

where $S_i(x)$ is the ith bit of a binary value resulting from a continuous input value x, n is any integer taken from the set $0, 1, \ldots, 2^{m-i}-1$, and $\tau_0, \tau_1, \ldots, \tau_p$ are p+1 fixed separator values defining p sub-ranges, wherein $\tau_0 < \tau_1 < \ldots < \tau_p$.

An exemplary embodiment according to any of the above-described aspects comprises the further step of performing, by the first and second parties, an error correction procedure for increasing the correlation between the sequences $\underline{A}$ and $\underline{B}$.

In an exemplary embodiment according to any of the above-described aspects, the step of performing the error correction procedure comprises the step of performing, by the first and second parties, the error correction procedure between each corresponding pair of values, $\underline{a}_i$, $\underline{b}_i$, in sequences $\underline{A}$ and $\underline{B}$, the error correction procedure being capable of correcting errors of up to a predetermined size.

In an exemplary embodiment according to any of the above-described aspects, the error correction procedure corrects any errors between corresponding values $\underline{a}_i$, $\underline{b}_i$, when the number of errors is less than or equal to the predetermined size, and tends to increase the error between corresponding values $\underline{a}_i$, $\underline{b}_i$, when the number of errors is greater than the predetermined size.

In an exemplary embodiment according to any of the above-described aspects, the predetermined size is q bits.

In an exemplary embodiment according to any of the above-described aspects, the error correction procedure comprises the step of, for each pair of corresponding values, $\underline{a}_i$, $\underline{b}_i$, in sequences $\underline{A}$ and $\underline{B}$, performing, the sub-steps of: generating, by one of the first and second parties, error correction information based the value $\underline{a}_i/\underline{b}_i$, in the sequence $\underline{A}/\underline{B}$ corresponding to that party, and transmitting the error correction information to the other party of the first and second parties; applying, by the other party, the error correction information to the corresponding value $\underline{b}_i/\underline{a}_i$, in the sequence $\underline{B}/\underline{A}$ corresponding to the other party.

In an exemplary embodiment according to any of the above-described aspects, the error correction information comprises the error correction bits of a systematic error correction code In an exemplary embodiment according to any of the above-described aspects, the error correction information comprises the parity bits of a BCH code.

In an exemplary embodiment according to any of the above-described aspects, the error correction information comprises fewer bits than the value on which the error correction information is based.

An exemplary embodiment according to any of the above-described aspects comprises the further step of retaining one or more bits at predetermined bit positions in each value, $\underline{a}_i$, $\underline{b}_i$, in sequences $\underline{A}$ and $\underline{B}$, and discarding the remaining bits.

In an exemplary embodiment according to any of the above-described aspects, one or more bits having the lowest correlation, or one or more bits having the highest correlation, are retained.

In an exemplary embodiment according to any of the above-described aspects, only the p lowest significant bits, or only the p highest significant bits are retained.

An exemplary embodiment according to any of the above-described aspects comprises the further step of repeating the data matching procedure using the values, $a_j$, $b_j$, comprising the retained bits.

An exemplary embodiment according to any of the above-described aspects comprises the further step of replacing each value, $a_i$, $b_i$, in sequences $\underline{A}$ and $\underline{B}$, with a parity value derived from each value, $a_i$, $b_i$.

An exemplary embodiment according to any of the above-described aspects comprises the further steps of: dividing the parity bits of each sequence $\underline{A}$ and $\underline{B}$, into sequential groups of p bits to form new values, $a_j$, $b_j$; and repeating the steps of any of the above-described aspects.

An exemplary embodiment according to any of the above-described aspects comprises the further step of generating a secret key from the shared secret information.

In an exemplary embodiment according to any of the above-described aspects, the shared secret information is used in a financial transaction.

In accordance with a further aspect of the present invention, there is provided a satellite comprising an apparatus according to any of the above-described aspects.

BRIEF DESCRIPTION OF THE FIGURES

Other aspects, and features, advantages and salient features of certain exemplary aspects and embodiments of the present invention will be more apparent from the following detailed description, which discloses exemplary embodiments of the invention, taken in conjunction with the accompanying drawings, in which.

DETAILED DESCRIPTION OF EXEMPLARY EMBODIMENTS OF THE INVENTION

Figure 1:
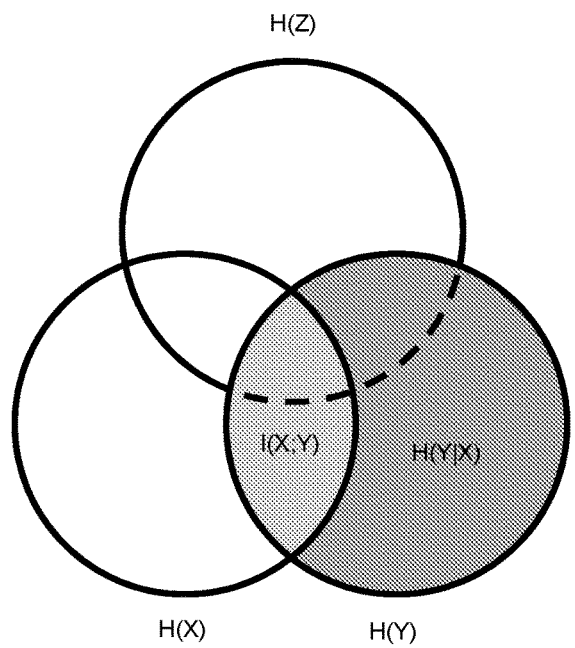
FIG. 1 is a schematic representation of the relationship between entropy, conditional entropy, and mutual information in the case of three random variables X, Y and Z.
Figure 1:
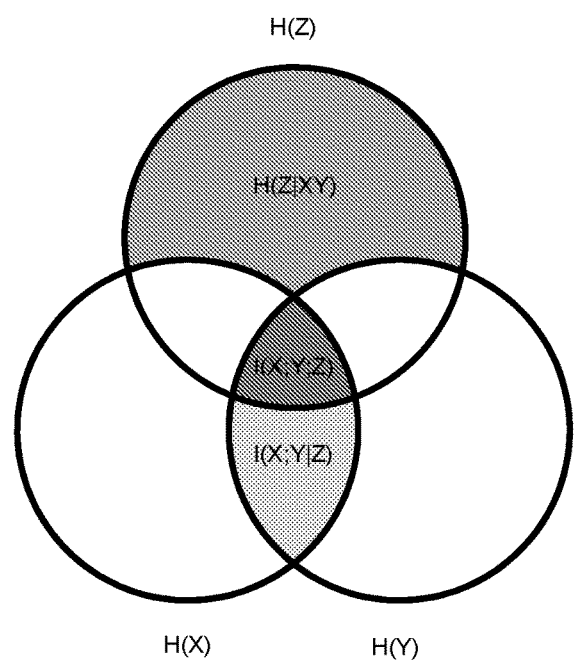

The skilled person will appreciate that the present invention is not limited to the specific embodiments described herein. The details of these embodiments are provided to assist the understanding of, and to explain the principles behind, the invention, but these should be regarded as merely exemplary and provided for illustration purposes only. The skilled person will thus appreciate that various changes and modifications can be made without departing from the scope of the invention, as defined by the claims. For example, the features described may be used in any suitable combination, and certain features may be added, omitted, or replaced with any suitable alternatives or equivalents.

In the following description, descriptions of well-known processes, functions, structures and constructions may be omitted for clarity and conciseness, and to avoid obscuring the subject matter of the invention.

The terms, expressions and words used in the following description and claims are not limited to the bibliographical meanings, but, are merely used by the inventor to provide a clear and consistent understanding and definition of the invention.

Throughout the description and claims of this specification, the singular forms "a," "an," and "the" include plural referents unless the context clearly dictates otherwise. Thus, for example, reference to "an object" includes reference to one or more of such objects.

Throughout the description and claims of this specification, the words "include", "comprise" and "contain" and variations of the words, for example "including", "comprising" and "containing", means "including but not limited to", and is not intended to (and does not) exclude other features, components, integers, steps, processes characteristics, or groups thereof.

Features, components, integers, steps, processes, characteristics, or groups thereof, described in conjunction with a particular aspect, embodiment or example of the invention are to be understood to be applicable to any other aspect, embodiment or example described herein unless incompatible therewith.

Throughout the description and claims of this specification, language in the general form of "X for Y" (where Y is some action, function, process, operation, activity or step and X is some means for carrying out that action, function, process, operation, activity or step) encompasses means X adapted, configured or arranged specifically, but not exclusively, to do Y.

The term "encryption" is understood herein to refer to a process whereby information is ciphered, obfuscated, masked etc. using secret information in order to render the information incomprehensible without knowledge of the secret information. The term "decryption" is understood herein to refer to an opposite process, whereby encrypted information is processed to recover the original information.

Among the techniques for allowing two parties, Alice and Bob, to obtain shared secret information in an unconditionally secure manner is Quantum Cryptographic Key Distribution (QKD), which includes Discrete Variable QKD (DV-QKD) and Continuous Variable QKD (CV-QKD).

In both DV-QKD and CV-QKD, data is exchanged between Alice and Bob by encoding the data in the quantum states of photons transmitted between Alice and Bob. In the case of DV-QKD, physical quantities that take discrete (quantised) values, such as the polarisation state of an individual photon, are used to carry the information. Thus, the data values exchanged using DV-QKD are discrete values. On the other hand, in the case of CV-QKD, physical quantities that have continuous spectrums are used to carry the information, such as the phase and amplitude (or equivalently, the quadrature components) of a coherent electromagnetic field (which may be regarded as a coherent stream of photons). Thus, the data values exchanged using CV-QKD may be continuous values.

Due to a fundamental property of quantum mechanics, any attempt by a third party eavesdropper, Eve, to measure the unknown quantum states of photons transmitted between Alice and Bob will result in those quantum states being disturbed. Furthermore, as a result of the "no-cloning theorem", it is not possible for Eve to create an identical copy of an arbitrary unknown quantum state. This means that it is possible for Alice and Bob to detect any attempt by Eve to eavesdrop on the communication.

CV-QKD provides several advantages in comparison to DV-QKD. For example, DV-QKD devices typically operate in the optical band of the electromagnetic spectrum. However, since the generation, and efficient detection, of individual photons is more difficult outside the optical band, non-optical-based DV-QKD is more difficult to implement. In contrast, CV-QKD can more easily exploit a wider range of the electromagnetic spectrum. For example, CV-QKD can be implemented more easily than DV-QKD in the microwave band, in which many existing communication systems already operate.

A communication system based on CV-QKD is described further below. However, before proceeding with the following description, certain useful concepts in the field of information theory will now be briefly described.

Consider a discrete random variable, X, characterised by the probability distribution function $P_X$. The entropy H of X is defined by:

$$H(X) = -\sum_{x \in X} P_X(x) \log_b(P_X(x)) \qquad \text{Eq. 1}$$

In Equation 1, x denotes a particular outcome of X, $P_X(x)$ is the probability of outcome x, and b is an arbitrary logarithmic base which determines the unit of the entropy. Frequently, the base b is chosen to be 2, in which case the unit of entropy is "bits". The entropy of X may be regarded as a measure of the uncertainty associated with outcomes of X. One interpretation is that the entropy (in bits) gives the average number of yes/no type questions needed to guess an outcome of X, when using an optimum guessing strategy, and is the average number of bits per outcome needed to encode a sequence of outcomes of X.

The conditional entropy H(X|Y) for discrete random variables X and Y is defined by:

$$H(X \mid Y) = \sum_{y \in Y} P_Y(y) \left[ -\sum_{x \in X} P_{X|Y}(x \mid y) \log_b(P_{X|Y}(x \mid y)) \right] \qquad \text{Eq. 2}$$

$$= -\sum_{\substack{x \in X \\ y \in Y}} P_{XY}(x, y) \log_b(P_{X|Y}(x \mid y))$$

In Equation 2, x and y denote, respectively, particular outcomes of X and Y, $P_X(x)$ and $P_Y(y)$ are the probabilities, respectively, of outcomes x and y, $P_{X|Y}(x|y)$ is the conditional probability of outcome x given outcome y, $P_{XY}(x,y)$ is the joint probability distribution of X and Y, and b is an arbitrary logarithmic base. The conditional entropy H(X|Y) may be interpreted as a measure of the uncertainty in X after observing Y.

The mutual information I(X; Y) for discrete random variables X and Y is defined by:

$$I(X; Y) = \sum_{\substack{x \in X \\ y \in Y}} P_{XY}(x, y) \log_b \frac{P_{XY}(x, y)}{P_X(x) P_Y(y)} \qquad \text{Eq. 3}$$

$$= H(X) - H(X \mid Y)$$

In Equation 3, x and y denote, respectively, particular outcomes of X and Y, $P_X(x)$ and $P_Y(y)$ are the probabilities, respectively, of outcomes x and y, $P_{XY}(x,y)$ is the joint probability distribution of X and Y, and b is an arbitrary logarithmic base.

From Equation 3, it can be seen that the mutual information I(X; Y) may be interpreted as the reduction in uncertainty in X after observing Y. Equivalently, the mutual information I(X; Y) may be interpreted as the amount of information gained about X after observing Y, or as the amount of information shared between X and Y. If X and Y are relatively highly correlated, then the mutual information I(X; Y) will be relatively high. Conversely, if X and Y are relatively lowly correlated, then the mutual information I(X; Y) will be relatively low. If X and Y are totally uncorrelated then I(X; Y)=0 while if X=Y then I(X; Y)=H(X). Mutual information is symmetric in its arguments: I(X; Y)=I(Y; X).

As an example, in the one-time pad scheme described above, the mutual information between the message M and the enciphered message $M^\varepsilon$ is equal to zero, $I(M; M^\varepsilon)=0$. Thus, Eve gains no information about the message M from the enciphered message $M^\varepsilon$. It is this property which makes the one-time pad scheme described above unconditionally secure.

The definitions of conditional entropy and mutual information given above may be extended to consider three discrete random variables X, Y and Z. For example, the conditional entropy H(X|YZ) may be interpreted as the uncertainty in X after observing Y and Z. The mutual information I(X; Y; Z) may be interpreted as the information shared between X, Y and Z. The mutual information I(X; Y|Z) may be interpreted as the information shared between X and Y that is not shared with Z.

The relationships between the various quantities in the case of three random variables X, Y and Z can be represented schematically, as illustrated in FIG. 1. In FIG. 1, the three overlapping circles represent H(X), H(Y) and H(Z), respectively. The quantities I(X; Y), H(Y|X), H(Z|XY), I(X; Y|Z) and I(X; Y; Z) are indicated by shaded regions. The areas representing the conditional entropy and mutual information for other combinations of variables in FIG. 1 can be deduced by symmetry.

The definitions of entropy, conditional entropy, and mutual information given by Equations 1-3 can also be extended to consider continuous random variables. Specifically, the definitions of entropy, conditional entropy, and mutual information corresponding to Equations 1-3 for continuous random variables X, Y and Z are given respectively by Equations 4-6.

$$H(X) = -\int_{-\infty}^{\infty} P_X(x)\log_b(P_X(x))dx \quad \text{Eq. 4}$$

$$H(X|Y) = -\int_{-\infty}^{\infty}\int_{-\infty}^{\infty} P_{XY}(x, y)\log_b(P_{X|Y}(x|y))dxdy \quad \text{Eq. 5}$$

$$I(X; Y) = \int_{-\infty}^{\infty}\int_{-\infty}^{\infty} P_{XY}(x, y)\log_b\left(\frac{P_{XY}(x, y)}{P_X(x)P_Y(y)}\right)dxdy \quad \text{Eq. 6}$$

In Equations 4-6, $P_X(x)$, $P_Y(y)$ are the probability density functions, respectively, of X and Y, $P_{X|Y}(x|y)$ is the probability density function of X conditional on Y, and $P_{XY}(x,y)$ is the joint probability density function of X and Y.

As in the case of discrete random variables, the definitions of conditional entropy and mutual information for two continuous random variables may be extended to consider three continuous random variables X, Y and Z. The relationships between the various quantities in the case of three continuous random variables X, Y and Z can also be represented schematically, as illustrated in FIG. 1.

Figure 2:
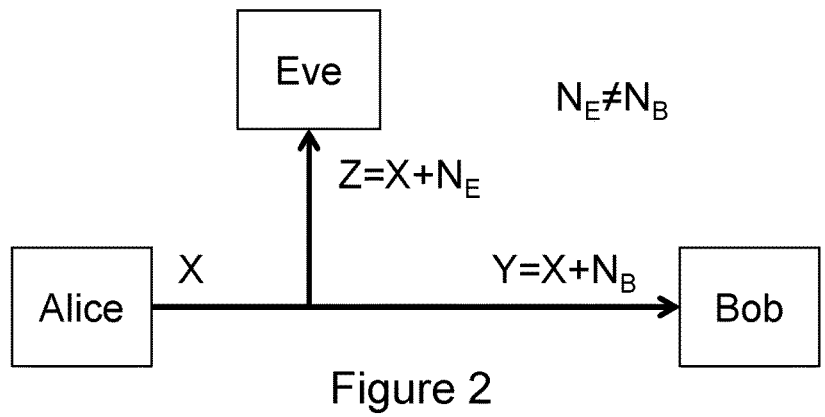
FIG. 2 schematically illustrates a communication system using Continuous-Variable Quantum Key Distribution.

Returning now to CV-QKD, a communication system using CV-QKD will now be described with reference to FIG. 2. In the system of FIG. 2, Alice first generates or obtains a sequence of values, denoted X, that are realisations of a first continuous random variable (which, for convenience, is also denoted X). Alice then prepares and transmits a signal, into which the sequence X is encoded, along a communication channel to Bob. For example, the continuous random variable X may be characterised by a Gaussian probability density function, and the sequence of outcome values X may be transmitted to Bob by modulating the amplitude and/or phase of a sequence of coherent electromagnetic (e.g. microwave) pulses generated by a laser.

Upon receiving the signal from Alice, Bob uses a detector (e.g. a homodyne or heterodyne detector) to detect the amplitude and/or phase of the signal to recover the sequence of values encoded in the signal. The sequence of values recovered by Bob through detection, denoted Y, may be regarded as realisations of a second continuous random variable, also denoted Y. Due to the presence of noise in the system (e.g. in Bob's detector), each value in sequence Y detected by Bob comprises the sum of a corresponding value in the original sequence X and a noise component. The relationship between sequences X and Y may therefore be conveniently written as $Y=X+N_B$, where $N_B$ denotes a sequence of noise values observed by Bob, and which may be regarded as realisations of a further continuous random variable, also denoted $N_B$.

By eavesdropping on the communication channel, Eve may also receive the signal from Alice. In a similar manner to Bob, Eve uses a detector (e.g. homodyne or heterodyne detector) to detect the amplitude and/or phase of the signal to recover the sequence of values encoded in the signal. The sequence of values recovered by Eve through detection, denoted Z, may be regarded as realisations of a third continuous random variable, also denoted Z. As before, due to the presence of noise in the system (e.g. in Eve's detector), each value in sequence Z detected by Eve comprises the sum of a corresponding value in the original sequence X and a noise component. The relationship between sequences X and Z may therefore be conveniently written as $Z=X+N_E$, where $N_E$ denotes a sequence of noise values observed by Eve, and which may be regarded as realisations of yet a further continuous random variable, also denoted $N_E$.

Sources of noise in the system illustrated in FIG. 1 may include preparation noise, thermal noise and shot noise. Preparation noise is noise that occurs during preparation of the modulated signal by Alice prior to transmission. Thermal noise is noise that originates within electronic components in the system. For example, thermal noise may be added during the signal detection process. Shot noise arises as a result of the discrete nature of the photons being used to transmit the information, and fluctuations in the numbers of photons arriving at a detector per unit time.

In general, the noise values observed at Bob's and Eve's respective apparatus (e.g. detectors) will be uncorrelated, so $(N_E; N_B)=0$. This relationship may be expressed informally as $N_E \neq N_B$.

Using a procedure known as reconciliation, Alice and Bob may obtain shared secret information from the different but correlated sequences of values X and Y, known respectively by Alice and Bob, given that Eve knows the sequence Z, which is different from, but correlated with, each of sequences X and Y. Reconciliation involves the exchange of messages between Alice and Bob to "distil" an amount of shared secret information from the sequences X and Y. This is possible because the sequences X and Y are correlated, and hence the information overlap between X and Y, is non-zero: $I(X; Y) \neq 0$. Reconciliation may be in the form of "direct reconciliation" or "reverse reconciliation", which differ in the roles that Alice and Bob take during the reconciliation procedure.

The communication process described above between Alice and Bob is unconditionally secure if $I(X; Y) > I(X; Z)$ for both direct reconciliation and reverse reconciliation. In the case of reverse reconciliation, which is a special case of reconciliation, unconditionally secure communication may still be achieved if the preceding inequality is not satisfied, but only if certain other conditions are satisfied, for example relating to the relative levels of noise within the communication system. Assuming no signal path losses, the preceding inequality will be satisfied if the noise observed at Eve's apparatus is greater than the noise observed at Bob's apparatus (which may be expressed informally as $N_E > N_B$), or more generally, if there is some path loss, if the Signal to Noise Ratio (SNR) observed at Eve's apparatus is lower than the SNR observed at Bob's apparatus.

In this case, the correlation between Alice's signal X and Bob's detected signal Y will be higher than the correlation between Alice's signal X and Eve's detected signal Z. Thus, Bob can gain more information about X from observing Y than Eve can from observing Z. Alice and Bob can exploit this information advantage to obtain shared secret information that is unknown to Eve using a suitable reconciliation procedure.

One problem with the CV-QKD communication system described above is that unconditional security is guaranteed on the basis of the assumption that the SNR at Eve's detector is lower than the SNR at Bob's detector. However, this may not be the case in many situations.

Figure 3:
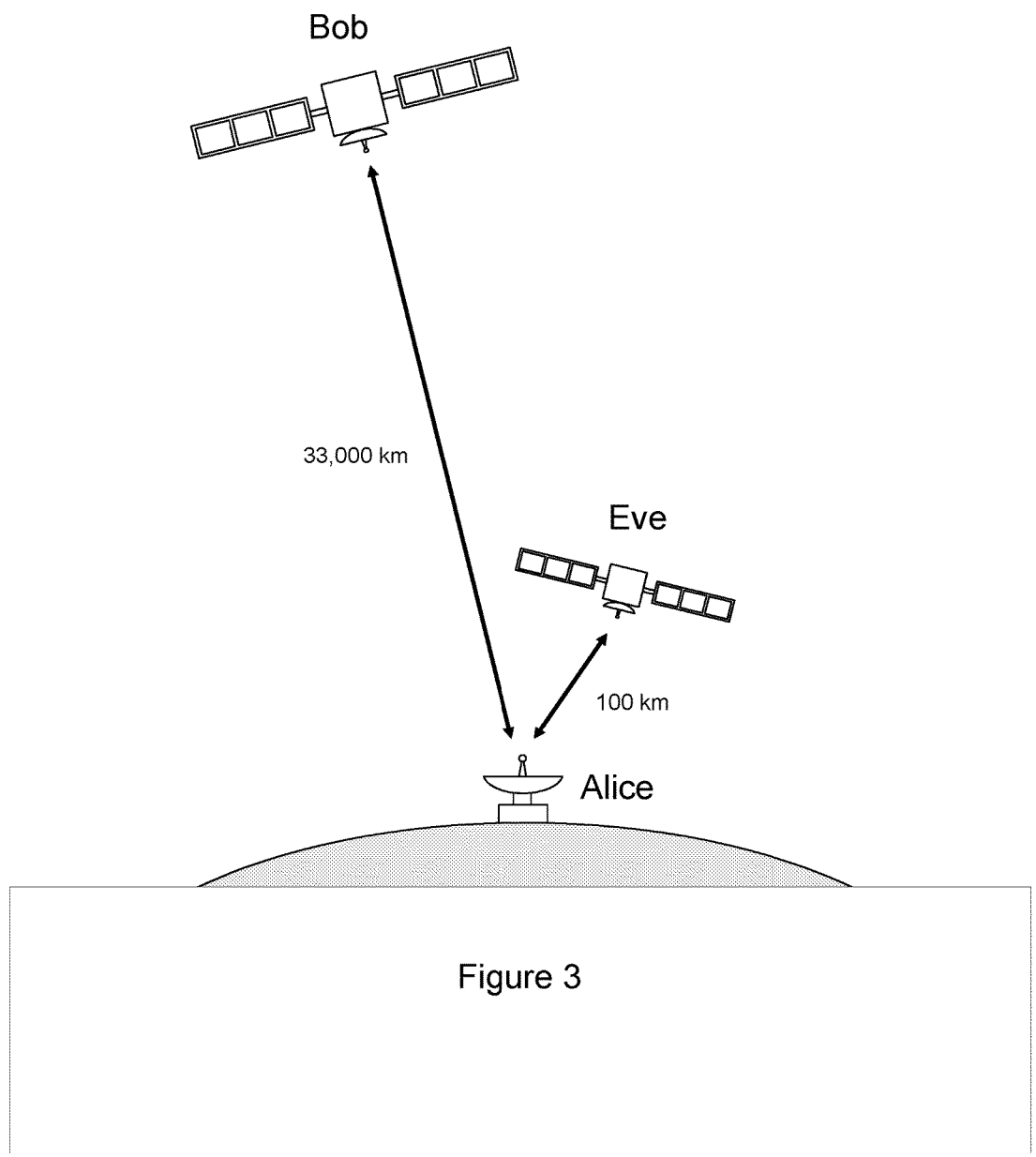
FIG. 3 is a schematic diagram of a scenario in which communication between a transceiver at the surface of the Earth and a High-Earth Orbit (HEO) satellite is intercepted by a Low-Earth Orbit (LEO) satellite.

For example, in one real-life scenario, illustrated in FIG. 3, Alice may be in the form of a transceiver at the surface of the Earth and Bob may be in the form of a High-Earth Orbit (HEO) or Medium Earth Orbit (MEO) satellite (e.g. at an altitude of approximately 33,000 km). In this scenario, significant path losses may occur between Alice and Bob, resulting in a relatively low SNR at Bob's detector. However, if Eve lies closer to Alice than Bob is, for example if Eve is in the form of a Low-Earth Orbit (LEO) satellite (e.g. at an altitude of approximately 100 km), then the path loss between Alice and Eve is likely to be relatively small, resulting in a higher SNR at Eve's detector than at Bob's detector.

In other scenarios, it may be possible for Eve to move arbitrarily close to Alice's transmitter in order to increase the SNR at Eve's detector.

This problem may be exacerbated in the case that Bob uses a detector that has a relatively high level of intrinsic noise. For example, thermal noise is typically relatively high in microwave detectors. Therefore, if a microwave channel is used for transmitting the sequence X, then the SNR observed by Bob may be relatively low.

Therefore, what is desired is a protocol that allows Alice and Bob to share secret information while preventing Eve from obtaining the secret information, in which unconditional security is guaranteed even if the SNR at Eve's detector is higher than the SNR at Bob's detector.

Another problem with the CV-QKD communication system described above is that the homodyne or heterodyne detector used by Bob to detect the sequence Y is relatively complex. Therefore, what is desired is a communication scheme that allows a simpler detector to be used.

An exemplary protocol for allowing two parties (Alice and Bob) to obtain shared secret information without a third party (Eve) gaining knowledge of the secret information will now be described. In the embodiments described below, the shared secret information is in the form of key information for use in a subsequent data transmission scheme. For example, the key information may be used to form a one-time pad. However, a protocol according to the present invention may be used to obtain other kinds of shared secret information.

Embodiments of the present invention may be used in a wide variety of different applications, including financial transactions, for example. Other applications include, but are not limited to, Police, Armed Forces, Government, mobile data, mobile voice, navigation and location information (e.g. GPS), financial services, banking, shipping communications, subscriber services, mobile security services, distributed networking, remote access, internet communications, virtual private networks, satellite communications, remote command and control systems, aircraft (e.g. drone aircraft), remote control, data storage and archiving, and identity management and security.

Figure 4:
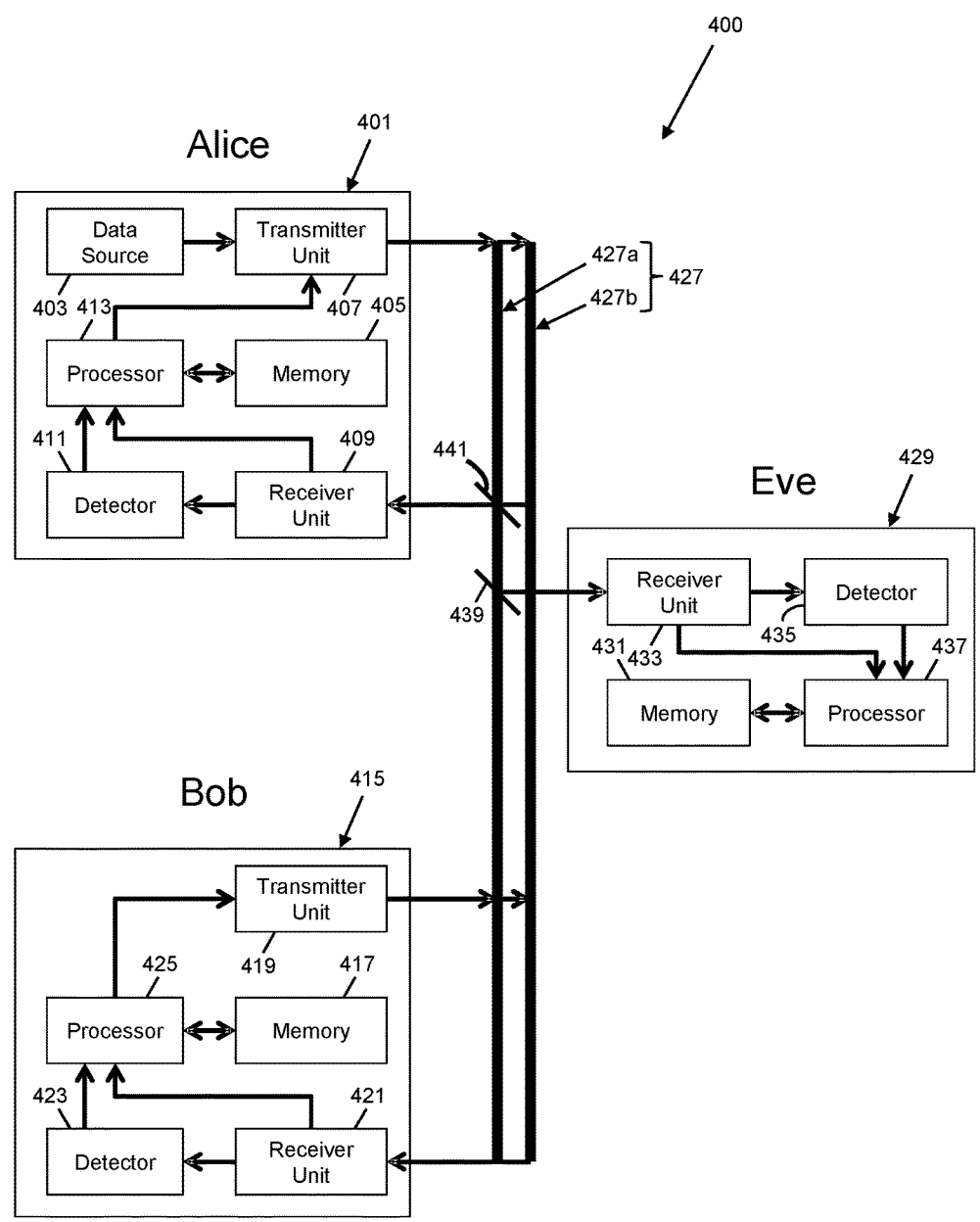
FIG. 4 schematically illustrates an exemplary communication system that implements an exemplary key distribution protocol according to the present invention.
Figure 5:
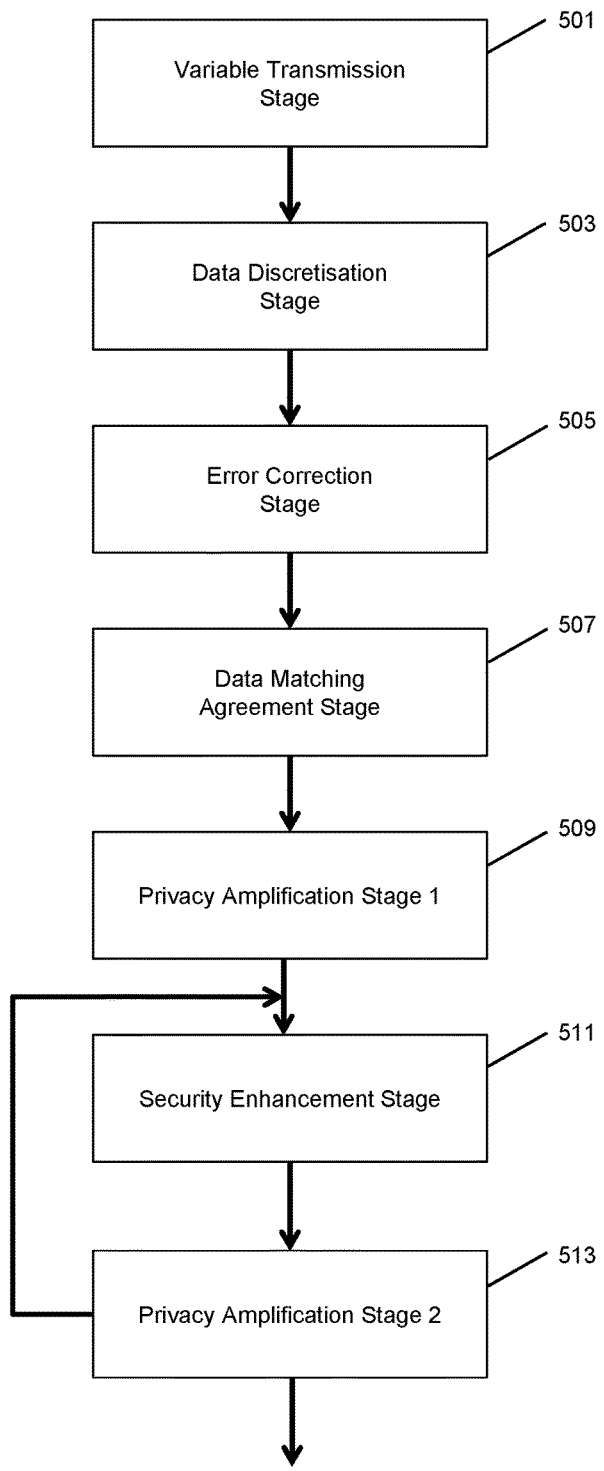
FIG. 5 is a flow diagram illustrating the various stages of an exemplary key distribution protocol according to the present invention.

FIG. 4 schematically illustrates an exemplary communication system that implements an exemplary key distribution protocol according to the present invention. FIG. 5 is a flow diagram illustrating the various stages of the protocol.

As shown in FIG. 4, the communication system 400 comprises a first apparatus 401 controlled by Alice, and a second apparatus 415 controlled by Bob. Alice's apparatus 401 comprises a data source 403, a memory 405, a transmitter unit 407, a receiver unit 409, a detector 411, and a processor 413. Bob's apparatus 415 comprises a memory 417, a transmitter unit 419, a receiver unit 421, a detector 423, and a processor 425. The transmitter unit 407 and receiver unit 409 of Alice's apparatus 401 and the transmitter unit 419 and receiver unit 421 of Bob's apparatus 415 enable a two-way communication link 427 to be established between Alice and Bob. In alternative embodiments, a transmitter unit and a receiver unit may be combined into a single transceiver unit.

The communication link 427 may form one or more separate channels 427a, 427b between Alice and Bob. For example, in the embodiment described below, two channels are used, although in other embodiments, a single channel, or more than two channels, could be used.

Each channel may be of any suitable form, such as a wired or wireless link, or an optical link. Each channel may be a classical channel or a quantum channel. For example, in the embodiment described below, one channel is a quantum channel and the other channel is a classical channel. A quantum channel is a channel that can transmit quantum information, which is information encoded within the state of a quantum system. A classical channel, or non-quantum channel, is a channel that can transmit classical information, which is information encoded within the state of a classical, or non-quantum, system.

In certain embodiments, the classical channel may be secured against modification. For example, the classical channel may be an authenticated channel in which Alice and Bob use a small amount of pre-shared key information to ensure that the signals transmitted in the classical channel are not altered.

As also shown in FIG. 4, a third apparatus 429, controlled by Eve, may be used by Eve to eavesdrop on the communications between Alice and Bob. Eve's apparatus 429 comprises a memory 431, a receiver unit 433, a detector 435, and a processor 437. Eve's apparatus 429 may be regarded as being a part of the overall communication system 400, or alternatively, may be regarded as being a parasitic element in addition to the communication system 400 formed by Alice's and Bob's apparatus 401, 415. In the embodiment described below, Eve's apparatus 429 does not comprise a transmitter unit because it is assumed that the communication link between Alice and Bob is trusted, in the sense that it is assumed that Eve's apparatus 429 does not modify or tamper with the signals transmitted between Alice and Bob. However, the protocol described below is effective against attacks in which Eve does tamper with the signals.

In the described embodiment, Alice's apparatus 401 forms part of a ground-based apparatus, Bob' apparatus 415 forms part of a HEO satellite and Eve's apparatus 429 forms part of a LEO satellite, similar to the system shown in FIG. 3. However, the present invention is not limited to any particular configuration. For example, the present invention may be applied to a system comprising any combination of terrestrial, ground-based, air-based and/or space-based apparatus.

In the described embodiment, the communication link between Alice and Bob is implemented using a 2.4 GHz free-space microwave communication channel. However, the present invention is not limited to any particular region or band of the electromagnetic spectrum, or method of transmission.

As shown in FIG. 5, the key distribution protocol comprises a number of stages, including a variable transmission stage 501, a data discretisation stage 503, an error correction stage 505, a data matching agreement stage 507, a first privacy amplification stage 509, a security enhancement stage 511, and a second privacy amplification stage 513.

As will become clear from the following detailed description, during execution of the protocol, Alice transmits a data sequence, which is received by Bob (and possibly Eve). Through a sequence of subsequent message exchanges between Alice and Bob (which may also be intercepted by Eve) the initial data sequence is used as seed data to obtain a secret data sequence that is shared between Alice and Bob, but unknown to Eve.

The protocol is based on the addition of uncorrelated random noise to the sequences occurring at Alice's side and Bob's side of the communication link. The protocol exploits the random and unpredictable nature of the noise to achieve unconditional security of the shared secret information. The noise can be realised in a variety of ways. For example, the noise may arise as an inherent or natural property of the communication system, or may be generated actively, intentionally and/or artificially. In some embodiments of the present invention, the noise is quantum mechanical in origin, and is therefore totally unpredictable and irreproducible. In other embodiments, the noise may be non-quantum mechanical in origin, for example generated from an algorithmic source.

If the data sequences known by Alice, Bob and Eve are represented by random variables X, Y and Z, respectively, then, as mentioned above in relation to FIG. 2, unconditional security may be obtained if $I(X; Y) > I(X; Z)$. However, in embodiments of the present invention, the protocol is designed such that the condition $I(X; Y|Z) > 0$ is satisfied. In other words, there exists at least some information that is shared between Alice and Bob that is not shared with Eve. This may be achieved by increasing the information overlap between Alice and Bob, $I(X; Y)$, while reducing the three-way information overlap between Alice, Bob and Eve, $I(X; Y; Z)$, and increasing $H(Z|XY)$.

The protocol is designed such that, even if the SNR observed by Bob is smaller than the SNR observed by Eve, unconditional security may still be achieved.

Furthermore, in certain embodiments, the way in which the sequence X is encoded in the signal received by Bob allows Bob to use a relatively simple detector.

Each stage of the protocol will now be described in detail.

Variable Transmission Stage

Figure 6:
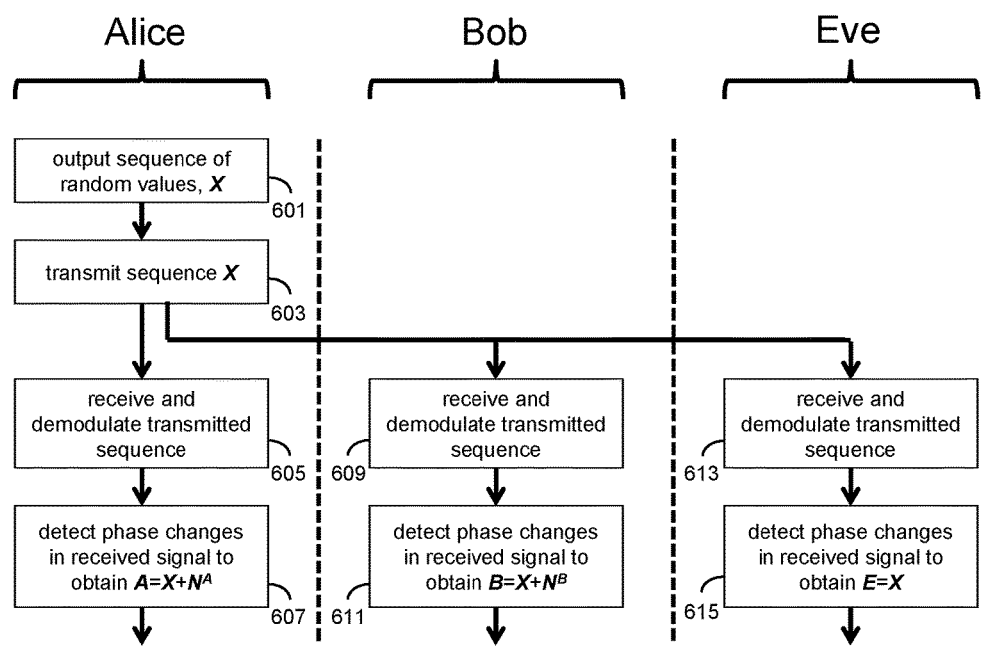
FIG. 6 is a flow diagram illustrating the various steps of the variable transmission stage shown in FIG. 5.

The variable transmission stage 501 is for transmitting a sequence of values from Alice to Bob. In the embodiment described below, the values are randomly generated, and the random values are continuously distributed. However, in other embodiments, non-random values (discrete or continuous), or random values taking only a discrete set of values may be used. In some embodiments, the values may be constant (e.g. a sequence of fixed values, including but not limited to zero). The values may be defined using any suitable representation. FIG. 6 is a flow diagram illustrating the various steps of the variable transmission stage in more detail.

In a first step 601, the data source 403 of Alice's apparatus 401 outputs a sequence of l random values, denoted $X = \{\chi_i\}$, $i = 1, 2, \ldots, l$ according to a continuous probability density function $PDF_\chi(\bullet)$. In the present embodiment, the probability density function $PDF_\chi(\bullet)$ is a Gaussian function having a mean of zero and a standard deviation normalised to 1, although any other suitable distribution may be used, such as a flat distribution. The sequence X may be generated in any suitable way. Although a sequence of values generated using an algorithmic random number generator may not be completely random in a strictly mathematical sense, an algorithmic source may still be acceptable for generating X. For example, in certain embodiments, the sequence X may not itself contain the secret information that will be eventually shared by Alice and Bob.

In a next step 603, the transmitter unit 407 of Alice's apparatus 401 transmits the sequence X using any suitable technique. For example, the sequence X may be transmitted using a classical channel or a quantum channel. In the present embodiment, a quantum channel is used to transmit X, in which the transmitter unit 407 modulates the amplitude and/or phase of a sequence of pulses of a coherent microwave source using the sequence values $\{\chi_i\}$, and wirelessly transmits the modulated signal using a transmitter. In other embodiments, a classical channel may be used to transmit X, in which a signal to be transmitted is modulated by the sequence values using a conventional classical technique, such as ASK, PSK, QAM etc.

The sequence X is transmitted from Alice to Bob using a first channel 427a. The first channel 427a may, for example, be regarded as insecure, in the sense that Eve may eavesdrop on the link and detect the signals transmitted over it. However, in the present embodiment, the link 427a may, for example, be regarded as trusted. This is because, for example, due to the quantum nature of the signal, any tampering or modification of the signal can be detected by Alice and/or Bob. The link may also be regarded as trusted if, for example, Alice and Bob perform a suitable scheme to verify or authenticate the values received by Bob, as described further below. In other embodiments, the link 427a may be regarded as untrusted.

In the steps described above, Alice's apparatus 401 may introduce some noise into the transmitted signal. For example, some preparation noise may be introduced during the preparation of the quantum states that form the transmitted signal. In addition, some thermal noise may also be introduced into the signal, for example originating from electronic components within Alice's apparatus 401. The preparation and thermal noise introduced by Alice's apparatus 401 will be present in the signals received by Alice's apparatus 401, Bob's apparatus 415 and Eve's apparatus 429. In the following description, the effects of these sources of noise will be ignored. However, the present invention is equally effective when the effects of these sources of noise are explicitly taken into account.

Next, the apparatus 401, 415, 429 of Alice, Bob and Eve perform certain steps in parallel, as described in the following.

At Bob's side, the receiver unit 421 of Bob's apparatus 515 receives and demodulates 609 the signal transmitted by Alice.

In a next step 611, the detector 423 of Bob's apparatus 415 detects amplitude and/or phase changes in the received signal to recover a corresponding sequence of l values, denoted $B = \{b_i\}$, $i = 1, 2, \ldots, l$. The detector 423 of Bob's apparatus 415 may be in the form of a homodyne detector or heterodyne detector, for example.

During the process of recovering the sequence B from the received signal, Bob's apparatus 415 introduces noise from one or more sources, including, for example, (random) thermal noise (including, for example, Johnson noise) and shot noise. The result is that each value $b_i$ in the sequence B recovered by Bob is the sum of a corresponding value $\chi_i$ in the original sequence X transmitted by Alice and a corresponding noise value $n^B_i$ resulting from the noise introduced by Bob's apparatus. This relationship may be expressed by $b_i = \chi_i + n^B_i$, $i = 1, 2, \ldots, l$, or equivalently by $B = X + N^B$ where $N^B=\{n^B_i\}$ i=1, 2, ..., l denotes the sequence of l noise values. The sequence B is stored in the memory 417 of Bob's apparatus 415.

At Alice's side, the receiver unit 409 of Alice's apparatus 401 also receives and demodulates 605 the signal transmitted by Alice. This may be achieved, for example, using a beam splitter 441, or other suitable signal divider, whereby a fraction (e.g. 50%) of the power of the transmitted signal is diverted to the Alice's receiver unit 409, while the remaining component of the signal is forwarded towards Bob's apparatus 415. In this case, the power of the signal received by Bob's apparatus 415 will be reduced.

In a next step 607, the detector 411 of Alice's apparatus 401 detects amplitude and/or phase changes in the received signal to recover a corresponding sequence of l values, denoted $A=\{a_i\}$, i=1, 2, ..., l. The detector 411 of Alice's apparatus 401 may be in the form of a homodyne detector or heterodyne detector, for example.

During the process of recovering the sequence A from the received signal, Alice's apparatus 401 introduces noise from one or more sources, including, for example, (random) thermal noise and shot noise. The result is that each value $a_i$ in the sequence A recovered by Alice is the sum of a corresponding value $\chi_i$ in the original sequence X transmitted by Alice and a corresponding noise value $n^A_i$ resulting from the noise introduced by Alice's apparatus. This relationship may be expressed by $a_i=\chi_i+n^A_i$, i=1, 2, ..., l, or equivalently by $A=X+N^A$ where $N^A=\{n^A_i\}$ i=1, 2, ..., l denotes the sequence of l noise values. The sequence A is stored in the memory 405 of Alice's apparatus 401.

The process of Alice's apparatus 401 receiving the signal that Alice's apparatus has itself transmitted may be regarded as a process in which Alice's apparatus 401 opens up a local channel (e.g. a continuous-variable local channel) to itself. This process is significant because it allows for a mutual information overlap between Alice and Bob that is not shared by Eve. In embodiments of the invention in any suitable means for opening up a local channel from Alice's apparatus to itself, or within Alice's apparatus 401, may be used.

In the present embodiment, the sequences of noise values $N^A$ and $N^B$ are characterised by continuous probability density functions $PDF_{NA}(\cdot)$ and $PDF_{NB}(\cdot)$, respectively. For example, in the case of thermal noise, the probability density functions $PDF_{NA}(\cdot)$ and $PDF_{NB}(\cdot)$ may each be Gaussian functions. However, the noise values $N^A$ and $N^B$ may arise from sources other than thermal noise and shot noise, and may be generated according to other probability density functions, such as a flat distribution. In some embodiments, the noise values $N^A$ and $N^B$ may take discrete values according to certain probability distribution functions. As mentioned above, in some embodiments, the noise may arise as an inherent or natural property of the communication system, while in other embodiments the noise may be generated actively, intentionally and/or artificially, for example by an algorithmic source.

The noise components introduced by Alice's and Bob's respective apparatus 401, 415 are independent. Furthermore, since the noise is random, the noise is unpredictable and irreproducible. For example, in the present embodiment, since the noise is quantum mechanical in origin, the noise is totally independent, unpredictable and irreproducible. However, although the sequences A and B recovered respectively by Alice's apparatus 401 and Bob's apparatus 415 will be different due to the noise $N^A$ and $N^B$, there will nevertheless be some correlation, and hence some information overlap, between sequences A and B.

Increasing the amplitude of the noise, $N^A$ and $N^B$, or increasing the noise-to-signal ratio (i.e. reducing the SNR), will tend to increase the security achieved by the protocol, but will tend to decrease the amount of data that is obtained from a given amount of initial seed data (i.e. the data rate). The level of noise, $N^A$ and $N^B$, introduced in or by Alice's apparatus 401 and Bob's apparatus 415, may be adjusted or controlled according to a desired or required level of security and/or data rate.

Since Alice's receiver unit 409 lies closer to Alice's transmitter 407 unit than Bob's receiver 421 unit does, Alice's receiver unit 409 may attenuate its received signal by an appropriate amount to compensate for differences in path loss and other reductions in power such that the SNR at Alice's apparatus 401 is as close as possible to the SNR at Bob's apparatus 415. However, in some embodiments, it is not necessary for the SNR at Alice's apparatus 401 to be the same as the SNR at Bob's apparatus 415. The level of noise, $N^A$ and $N^B$, introduced in or by Alice's apparatus 401 and Bob's apparatus 415, may be adjusted or controlled to achieve the same, similar, or a different SNR at Alice's apparatus 401 and Bob's apparatus 415.

In the present embodiment, the noise added to the sequences A and B is in the form of detector noise, where a channel is opened up between Alice's apparatus 401 and Bob's apparatus 415 and Alice's apparatus 401 opens up a local channel to itself. However, in other embodiments, any suitable alternative or additional methods of adding noise to obtain sequences A and B may be used. The noise may be added in equal amounts, or in amounts to achieve the same SNR at Alice's apparatus 401 and Bob's apparatus 415.

In the embodiment described above, Alice generates and transmits the sequence X, which is received by Alice and Bob. However, in other embodiments, the sequence X may instead be generated and transmitted by another trusted party, which may be referred to as 'Charles' (see FIG. 8). In this case, a channel is opened up between Charles and Alice, so that Alice receives the sequence X transmitted by Charles, and with the addition of noise, Alice obtains sequence A. Similarly, a channel is opened up between Charles and Bob, so that Bob receives the sequence X transmitted by Charles, and with the addition of noise, Bob obtains sequence B. In this case, it is not necessary for Alice to open up a local channel to herself.

In order to attempt to obtain the information that will eventually be shared between Alice and Bob using the protocol, Eve may attempt to mirror certain steps of the protocol carried out by Alice and/or Bob. For example, as illustrated in FIG. 6, at Eve's side, by eavesdropping on the communication link, the receiver unit 433 of Eve's apparatus 429 also receives and demodulates 613 the signal transmitted by Alice. Eve may intercept the signal, for example, using a beam splitter 439, or other suitable signal divider, whereby a fraction of the power of the transmitted signal is diverted to Eve's receiver unit 433, while the remaining component of the signal is forwarded towards Bob's apparatus 415. In this case, the power of the signal received by Bob's apparatus 415 will be reduced.

In a next step 615, the detector 435 of Eve's apparatus 429 detects amplitude and/or phase changes in the received signal to recover a corresponding sequence of l values, denoted $E=\{e_i\}$, i=1, 2, ..., l, which is stored in the memory 431 of Eve's apparatus.

During the process of recovering the sequence E from the received signal, Eve's apparatus 429 may introduce noise, $N^E=\{n^B_i\}$ i=1, 2, ..., l, resulting in a sequence $E=X+N^E$, where the noise $N^E$ is similar to the noise introduced by Alice's apparatus 401 and Bob's apparatus 415. However, in the present embodiment, as a "worst case scenario" from the point of view of security, it is assumed that Eve's apparatus 429 uses an ideal detector in which noise is reduced to the lowest possible level, possibly zero noise, $N^E=\{0\}$, in which case $E=X$. For example, by using a suitably cooled detector, thermal noise may be reduced to substantially zero.

However, while some sources of noise may be eliminated using an ideal detector, under certain circumstances, other sources of noise, such as shot noise, may always be present to some extent. Since the level of shot noise is typically smaller than the level of thermal noise, the SNR observed by Bob is likely to be smaller than the SNR observed by Eve. For example, Bob may observe a SNR that is eight orders of magnitude lower than that observed by Eve. However, even in this case, the noise observed by Eve is non-zero, and Alice and Bob are still able to obtain shared secret information.

Although the sequence E recovered by Eve's apparatus 429 will be different from each of the sequences A and B due the noise $N^A$ and $N^B$, there will nevertheless be some correlation, and hence some information overlap, between sequence E and each of sequences A and B.

Figure 7:
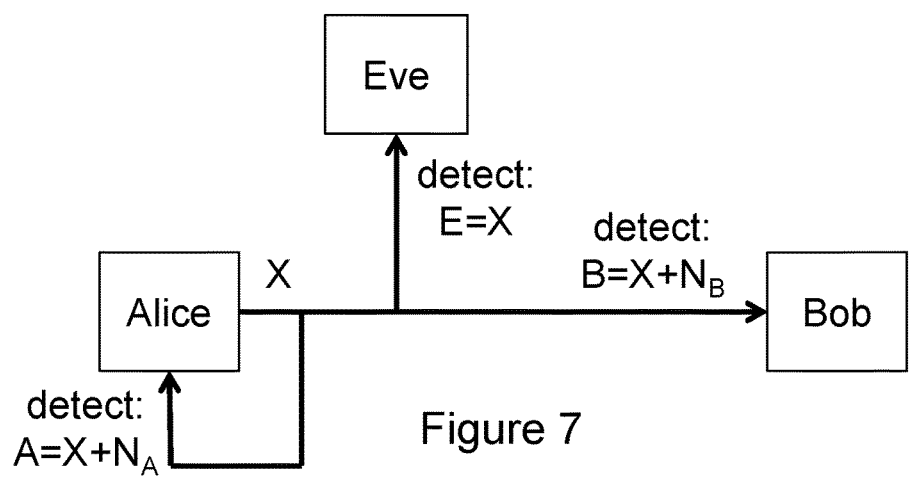
FIG. 7 schematically illustrates the detection of sequences A, B and E by Alice, Bob and Eve in the variable transmission stage shown in FIG. 5.
Figure 8:
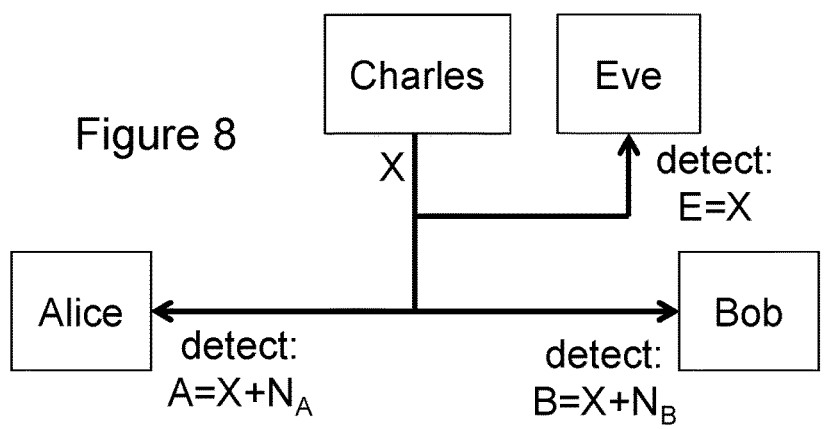
FIG. 8 schematically illustrates an alternative configuration for the detection of sequences A, B and E by Alice, Bob in the variable transmission stage.
Figure 9:
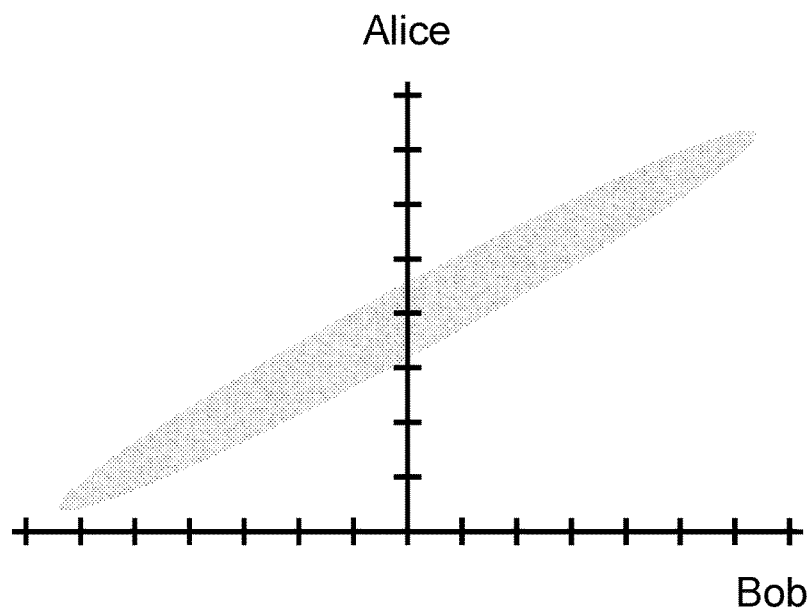
FIG. 9 is a graph illustrating the relationship between corresponding data values in the sequences A and B detected by Alice and Bob in the variable transmission stage shown in FIG. 5.

FIG. 7 schematically illustrates the detection of sequences A, B and E by Alice, Bob and Eve in the present embodiment. FIG. 8 schematically illustrates an alternative configuration for the detection of sequences A, B and E by Alice, Bob and Eve, in which Charles transmits the sequence X. FIG. 9 is a graph illustrating the relationship between corresponding data values in the sequences A and B detected by Alice and Bob. As shown in FIG. 9, the noise introduced into sequences A and B results in a spreading of the data points.

Due to the correlations between sequences A, B and E, following the variable transmission stage, there will be at least some information overlap between Alice, Bob and Eve, and the mutual information values I(A; B), I(A; E), I(B; E) and I(A; B; E) will each be non-zero. At this stage, the information overlap between Alice and Bob may be less than the information overlap between Alice and Eve, so that I(A; B)<I(A; E).

In the variable transmission stage described above, data may be encoded into a transmitted signal by modulating the amplitude and/or phase of the signal. However, in some embodiments, only one of amplitude and phase are modulated. Although modulating only one of the amplitude and phase will reduce (e.g. halve) the overall data rate, the advantage is that the detector used to recover the sequence encoded into the signal may be simpler. For example, by modulating only one of the amplitude and phase, it is not necessary to use a homodyne or heterodyne detector.

In one embodiment, at this stage of the protocol, Alice and/or Bob may detect any tampering or modification of the signal by Eve using any suitable technique. For example, in one embodiment, in addition to the transmission described above, Alice transmits the sequence X to Bob a second time, but this time using a transmission power that is sufficiently high such that the SNR is sufficiently high that, when Bob performs detection, the recovered sequence will be equal to X with a high degree of accuracy. Thus, Alice and Bob both know the sequence X. Bob then sends a random selection of values back to Alice who can then detect any differences in the data.

If any tampering or modification is detected, the protocol may be aborted and re-run from the beginning.

Data Discretisation Stage

The variable transmission stage 501 is followed by the data discretisation stage 503. This stage is for converting the continuous-valued sequences A and B recovered respectively by Alice's apparatus 401 and Bob's apparatus 415 to corresponding discrete-valued sequences $\underline{A}$ and $\underline{B}$. If the values of sequences A and B obtained by Alice and Bob are already discrete, for example if X, $N^A$ and $N^B$, each consist of discrete values, then the data discretisation stage 503 may be omitted. The reason for using discrete-valued sequences $\underline{A}$ and $\underline{B}$ rather than continuous-valued sequences A and B is so that the probability of finding an exact match between corresponding values in sequences $\underline{A}$ and $\underline{B}$ is non-zero. In particular, the probability of two random continuous values being exactly equal is infinitesimally small.

In the present embodiment, discretisation is performed by converting each recovered continuous value into a corresponding (discrete) binary value using data slicing. However, it will be appreciated that, in alternative embodiments, other ways to discretise values could be used, and the discretised values may have a representation other than binary. In any event, in the present embodiment, both Alice and Bob use the same discretisation scheme.

Figure 11:
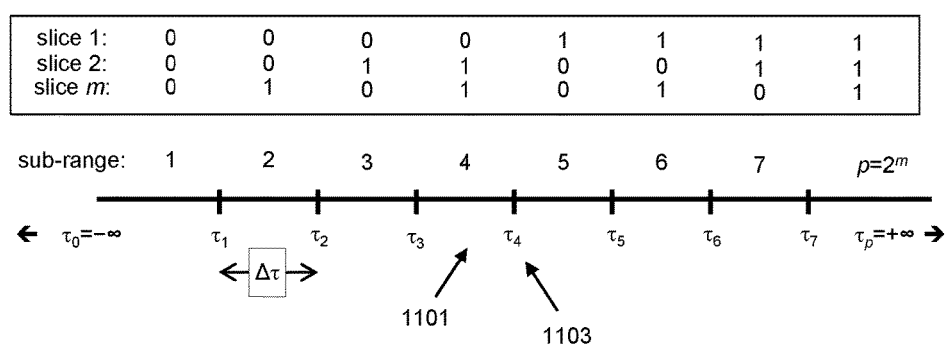
FIG. 11 schematically illustrates an exemplary data slicing method.
Figure 10:
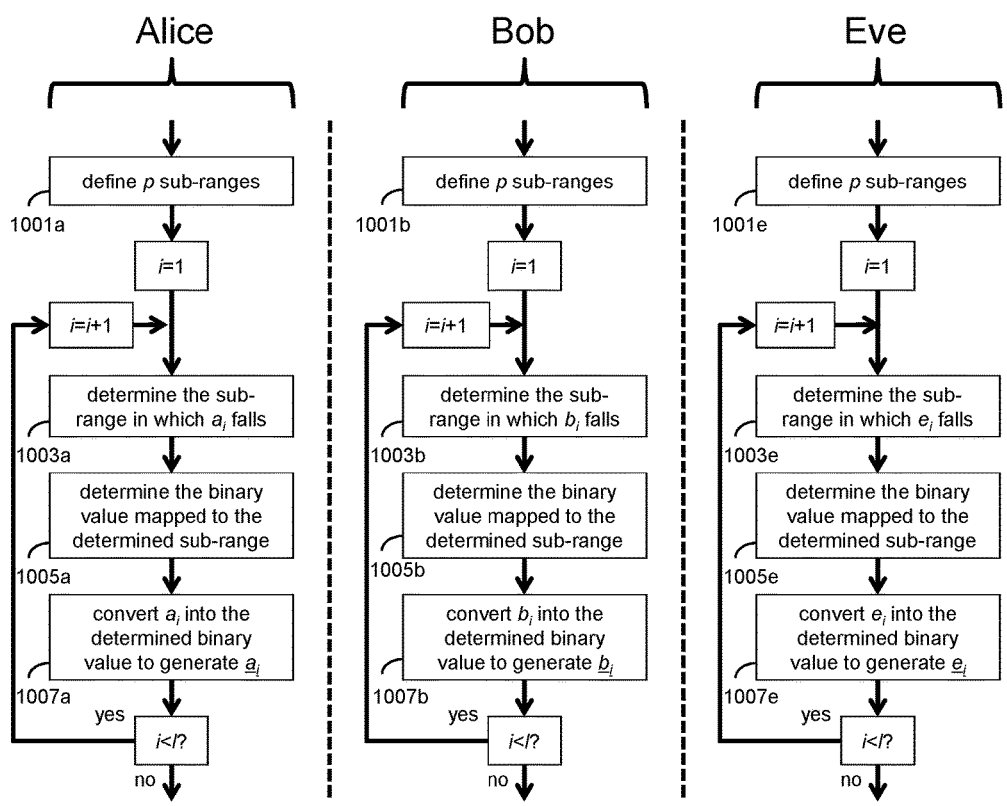
FIG. 10 is a flow diagram illustrating the various steps of the data discretisation stage shown in FIG. 5.

FIG. 10 is a flow diagram illustrating the various steps of the data discretisation stage 503 of the present embodiment in more detail, while FIG. 11 schematically illustrates an exemplary data slicing method.

As shown in FIG. 11, a numerical range covering the range of values in the sequences A and B is divided into p sub-ranges 1101. The number of sub-ranges p may be an integer power of 2, i.e. such that $p=2^m$. The p sub-ranges may be defined by p+1 fixed separator values $\tau_0, \tau_1, \ldots, \tau_p$ 1103 where $\tau_0 < \tau_1 < \ldots < \tau_p$. In the example shown in FIG. 11, $\tau_0 = -\infty$, $\tau_p = -\infty$ and $\tau_k = \tau_{k-1} + \Delta\tau$ (k=2, ..., p-1 and $\Delta\tau$ constant). The jth sub-range (j=1, 2, ..., $2^m$) is then defined by the range of values of x such that $\tau_{j-1} < x \leq \tau_j$. A binary value is mapped to each sub-range using any suitable scheme. In the example shown in FIG. 11, binary values are mapped to the sub-ranges such that the m-bit binary representation of j-1 is mapped to the jth sub-range (j=1, 2, ..., $2^m$). For the purpose of illustration, in FIG. 11, values of p=8 and m=3 are used. However, other values may be used. For example, in the present embodiment, a value of m=11 is used. In another embodiment, a value of m=16 may be used.

The level of noise, $N^A$ and $N^B$, introduced in or by Alice's apparatus 401 and Bob's apparatus 415, and/or the data slicing parameters, should be adjusted or controlled such that, after discretisation, the noise registers in the discretised, or sliced, data. For example, preferably, the addition of noise should tend to cause a significant fraction of the data values to overflow to different sub-ranges relative to the sub-ranges the data values would have fallen in, in the absence of noise (although some values may not overflow, for example if a particular individual noise value happens to be relatively small).

To discretise a value v, the following steps are performed. In a first step 1001, p sub-ranges are defined, as described above. In a next step 1003, the sub-range 1101 in which the value v falls is determined. In a next step 1005, the binary value that is mapped to the sub-range 1101 found in the preceding step 1003 is determined. In a next step 1007, the value v is converted to the binary value found in the preceding step 1005. For example, in the exemplary case illustrated in FIG. 11, a value v that is greater than $\tau_3$ and less than or equal to $\tau_4$ falls within sub-range 4, and is therefore converted to a binary value 011.

The data slicing method described above may be summarised by Equation 7 below.

$$S_i(x) = \begin{cases} 0 & \text{if } \tau_{2^i n} \le x < \tau_{2^i n + 2^{i-1}} \\ 1 & \text{otherwise} \end{cases} \quad \text{Eq. 7}$$

In Equation 7, $S_i(x)$ is the ith bit of the binary value resulting from a continuous input value x, and n is any integer taken from the set $0, 1, \ldots, 2^{m-i}-1$.

In accordance with the protocol, and as illustrated in FIG. 10, the processor 413 of Alice's apparatus 401 converts each value $a_i$ of the sequence A stored in the memory 405 of Alice's apparatus 401 to a corresponding discrete m-bit binary value, denoted $\underline{a}_i$, using the data slicing method described above, thereby generating a corresponding sequence of binary values, denoted $\underline{A}=\{\underline{a}_i\}$, i=1, 2, ..., l. Similarly, the processor 413 of Bob's apparatus 415 converts each value $b_i$ of the sequence B stored in the memory 417 of Bob's apparatus 415 to a corresponding discrete m-bit binary value, denoted $\underline{b}_i$, using the same data slicing method, thereby generating a corresponding sequence of binary values, denoted $\underline{B}=\{\underline{b}_i\}$, i=1, 2, ..., l.

As illustrated in FIG. 10, Eve's apparatus 429 mirrors the steps carried out by Bob' apparatus 415, so that the processor 437 of Eve's apparatus 429 coverts the sequence E={$e_i$} stored in the memory 431 of Eve's apparatus 429 into a corresponding sequence of m-bit binary values, denoted $\underline{E}=\{\underline{e}_i\}$, i=1, 2, ..., l.

In cases in which the level of Alice's noise $N^A$ is relatively low (which may be the case in systems in which Alice does not actually open up a local channel to herself, such that $N^A=\{0\}$), the number of slices, and/or the definition of the sub-ranges that the sliced values are mapped to, may be selected to ensure that Alice and Bob are able to obtain shared secret information even if the SNR observed by Bob is smaller than the SNR observed by Eve. In particular, in the following, it is assumed that the only source of noise observed by Eve is shot noise, and it is further assumed that the signal strength observed by Eve is maximal, for example because Eve's receiver is located as close as possible to Alice's transmitter. Under these assumptions, the SNR observed by Eve is maximal.

In order to ensure that discretised sequences $\underline{A}$ and $\underline{E}$ are not identical, or at least not very similar, the width of the sub-ranges may be chosen so that, even if Eve observes a maximal SNR, at least some of the values of sequence $\underline{E}$ fall into a different sub-range to the corresponding value of sequence $\underline{A}$. For example, if the sub-ranges are too wide, then the relatively small amount of noise observed by Eve is unlikely to perturb a value of sequence X sufficiently so that the corresponding values of discretised sequences $\underline{A}$ and $\underline{E}$ fall within different sub-ranges.

For example, in certain embodiments, the number of slices may be chosen to satisfy equation 8, as follows.

$$2^m > \frac{S}{N} \quad \text{Eq. 8}$$

In equation 8, m is the number of slices, S is the signal level observed by Eve, and N is the noise level observed by Eve. For example, S may be the maximal signal observed by Eve by locating her receiver as close as possible to Alice's transmitter, while N may be the lowest possible level of noise observed by Eve by using an ideal detector, for example leaving shot noise only.

Returning now to the protocol, the sequences $\underline{A}$, $\underline{B}$ and $\underline{E}$, each consisting of m×l bits in total, are stored in the memories 405, 417, 431 of Alice's apparatus 401, Bob's apparatus 415 and Eve's apparatus 429, respectively. The values forming each of these sequences will be characterised by a certain respective probability distribution function, and the relationships between the sequences will be characterised by certain joint probability distribution functions and conditional probability functions.

Following the data discretisation stage, there will be correlations between the discretised sequences $\underline{A}$, $\underline{B}$ and $\underline{E}$. Therefore, there will be at least some information overlap between Alice, Bob and Eve, and the mutual information values $I(\underline{A}; \underline{B})$, $I(\underline{A}; \underline{E})$, $I(\underline{B}; \underline{E})$ and $I(\underline{A}; \underline{B}; \underline{E})$ will each be non-zero. As in the Variable Transmission stage, the information overlap between Alice and Bob may be less than the information overlap between Alice and Eve, so that $I(\underline{A}; \underline{B}) < I(\underline{A}; \underline{E})$.

Each bit of a binary value obtained by converting a continuous value according to the method described above may be referred to as a "slice". The slices of a converted binary value may be numbered in order of bit significance, so that, for example, the most significant bit is denoted slice number 1 and the least significant bit is denoted slice number m. The jth slice of a value $\underline{a}_i$ may be denoted $\underline{a}_{i,j}$. Similarly, a sequence may be sliced by extracting a slice of particular order of each value in that sequence. For example, the binary values obtained by taking the jth slice of each value $\underline{a}_i$ of the sequence $\underline{A}$ may be regarded as forming a sequence slice {$\underline{a}_{i,j}$}=$\underline{A}_j$.

Since each slice corresponds to a bit of different significance, then depending on the way in which binary values are mapped to sub-ranges in the conversion process, the bit error rate resulting from noise will be different for different slices. In particular, in the Example described above, the bit error rate increases moving from the first slice (most significant bit) towards the mth slice (least significant bit). This means that there will be the highest correlation, and therefore highest mutual information, between Alice and Bob in the first slice. Conversely, there will be the lowest correlation, and therefore lowest mutual information, between Alice and Bob in the mth slice. In particular, $I(\underline{A}_j; \underline{B}_j) > I(\underline{A}_k; \underline{B}_k)$ for j<k. Similar relationships apply between Alice and Eve and between Bob and Eve.

Each sequence slice $\underline{B}_i$ of sequence $\underline{B}$ may be regarded as being the result of transmitting a corresponding sequence slice $\underline{A}_i$ of sequence $\underline{A}$ through a binary symmetric channel. The error probability of the binary symmetric channel will, in general, be different for each slice, increasing moving from the first slice to the mth slice.

Although a specific mapping between binary values and sub-ranges is used in the example described above, any suitable mapping between binary values and sub-ranges may be chosen to satisfy the condition $I(\underline{A}_j; \underline{B}_j) > I(\underline{A}_k; \underline{B}_k)$ for j<k, or the condition $I(\underline{A}_j; \underline{B}_j) > (\underline{A}_k; \underline{B}_k)$ for j>k, or more generally, to create differences in the mutual information between $\underline{A}$ and $\underline{B}$ with respect to different slices.

In the following stages of the protocol, certain information is exchanged between Alice's apparatus 401 and Bob's apparatus 415 in order to obtain the shared secret information. In the present embodiment, this information exchange is performed using a second channel 427b, which is different from the first channel 427a used in the variable transmission stage 501. The second channel 427b may be in the form of an error-corrected channel. For example, the information may be transmitted in the form of messages that have any suitable error correction technique applied to them. On the other hand, in the present embodiment, the transmission of data in the variable transmission stage 501 described above is performed using a non-error-corrected channel. The error-corrected channel and non-error-corrected channel may be implemented using the same physical channel, or, alternatively, using different physical channels, as illustrated in FIG. 4.

Error Correction Stage

Figure 12:
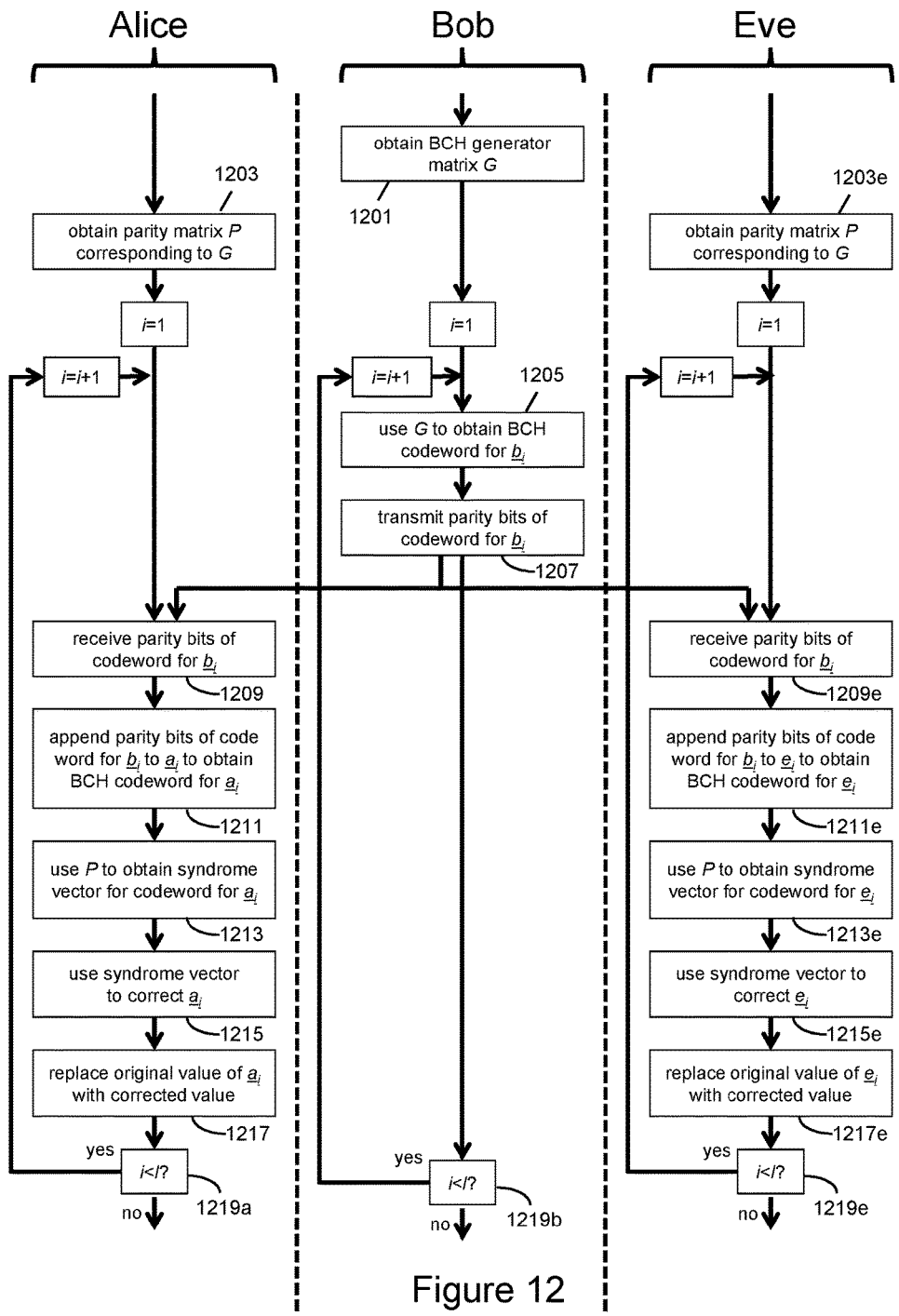
FIG. 12 is a flow diagram illustrating the various steps of the error correction stage shown in FIG. 5.

The data discretisation stage 503 is followed by the error correction stage 505, which may also be referred to as a reconciliation stage. FIG. 12 is a flow diagram illustrating the various steps of the error correction stage in more detail. In the following description, references to "corresponding" values of different sequences refer to those values at the same position in the respective sequences. For example, the values $a_i$, $b_i$ and $e_i$ for the same value of i, are corresponding values of sequences $\underline{A}$, $\underline{B}$ and $\underline{E}$.

After the data discretisation stage 503 has been performed, corresponding values of sequences $\underline{A}$, $\underline{B}$ and $\underline{E}$ obtained respectively by Alice, Bob and Eve will not, in general, match due to the independent noise components of the original sequences $A=X+N^A$ and $B=X+N^B$. However, by chance, some corresponding values will match exactly, or differ by only a relatively small error, between $\underline{A}$ and $\underline{B}$, between $\underline{A}$ and $\underline{E}$, and/or between $\underline{B}$ and $\underline{E}$. The error correction stage is for increasing the number of matching corresponding values between $\underline{A}$ and $\underline{B}$, while preventing Eve from increasing the number of matching corresponding values either between $\underline{A}$ and $\underline{E}$ or between $\underline{B}$ and $\underline{E}$. In other words, the error correction stage allows Alice and Bob to increase the correlation between their respective sequences, while preventing Eve from increasing the correlation between her sequence and either of Alice's and Bob's sequences by at least the same degree.

In order to increase the number of matching corresponding values between sequences $\underline{A}$ and $\underline{B}$, an error correction method is used. In the illustrated embodiment, this method involves iterating through each value of sequences $\underline{A}$ and $\underline{B}$ and applying an error correction code to attempt to correct errors between corresponding values of $\underline{A}$ and $\underline{B}$.

Whenever corresponding values in $\underline{A}$ and $\underline{B}$ match exactly, the result of applying the error correction code is that the values will be unchanged, and therefore remain matched. Whenever corresponding values in $\underline{A}$ and $\underline{B}$ do not match exactly, but match closely (meaning that the error (e.g. the Hamming distance) between the values is no greater than a certain amount), the result of applying the error correction code is that the error between the values will be reduced to zero (i.e. the error will be corrected) and the values will become exactly matched. However, whenever corresponding values in $\underline{A}$ and $\underline{B}$ do not match, either exactly or closely, the result of applying the error correction code is that the error between the values is not likely to be corrected, and furthermore the error is likely to increase (due to the inability of the error correction code to correct an error greater than the certain amount).

Thus, after performing this error correction procedure, a certain subset of corresponding values in sequences $\underline{A}$ and $\underline{B}$ will be highly correlated (exactly matching), while the remaining values will be less correlated than before. The highly correlated subset is extracted in the next stage of the protocol.

Since at least some corresponding values in $\underline{A}$ and $\underline{B}$ are likely to match exactly, even prior to the error correction stage, then the error correction stage may not be required in some cases, and may therefore be omitted in alternative embodiments. However, performing the error correcting stage will tend to increase the amount of shared secret information that is obtained from a given amount of initial seed data. This increase relates to those corresponding values that do not match exactly, but differ by only a relatively small error, i.e. those corresponding values that become exactly matched as a result of performing the error correction stage. The error correction stage also helps to decrease the information overlap between Eve and Alice/Bob.

At Eve's side, whenever corresponding values in $\underline{A}$ and $\underline{B}$ do match (either exactly or closely) then it is unlikely that the corresponding value in $\underline{E}$ will also match (either exactly or closely) the corresponding values in $\underline{A}$ and $\underline{B}$. Thus, whenever corresponding values in $\underline{A}$ and $\underline{B}$ become matched by the error correction method, if Eve attempts to use the error correction code to match her data with Alice's data and Bob's data, then the result is that the error between corresponding values between E and $\underline{A}$ and between $\underline{E}$ and $\underline{B}$ is likely to increase. Thus, as a result of the error correction method, for the certain subset of corresponding values in $\underline{A}$ and $\underline{B}$ that become highly correlated, the corresponding subset of values in $\underline{E}$ is likely to become less correlated with $\underline{A}$ and $\underline{B}$.

The result is that, for this certain subset of values, the information overlap between Alice and Bob, $I(\underline{A}; \underline{B})$, increases while the three-way information overlap between Alice, Bob and Eve, $I(\underline{A}; \underline{B}; \underline{E})$ is reduced.

Figure 13:
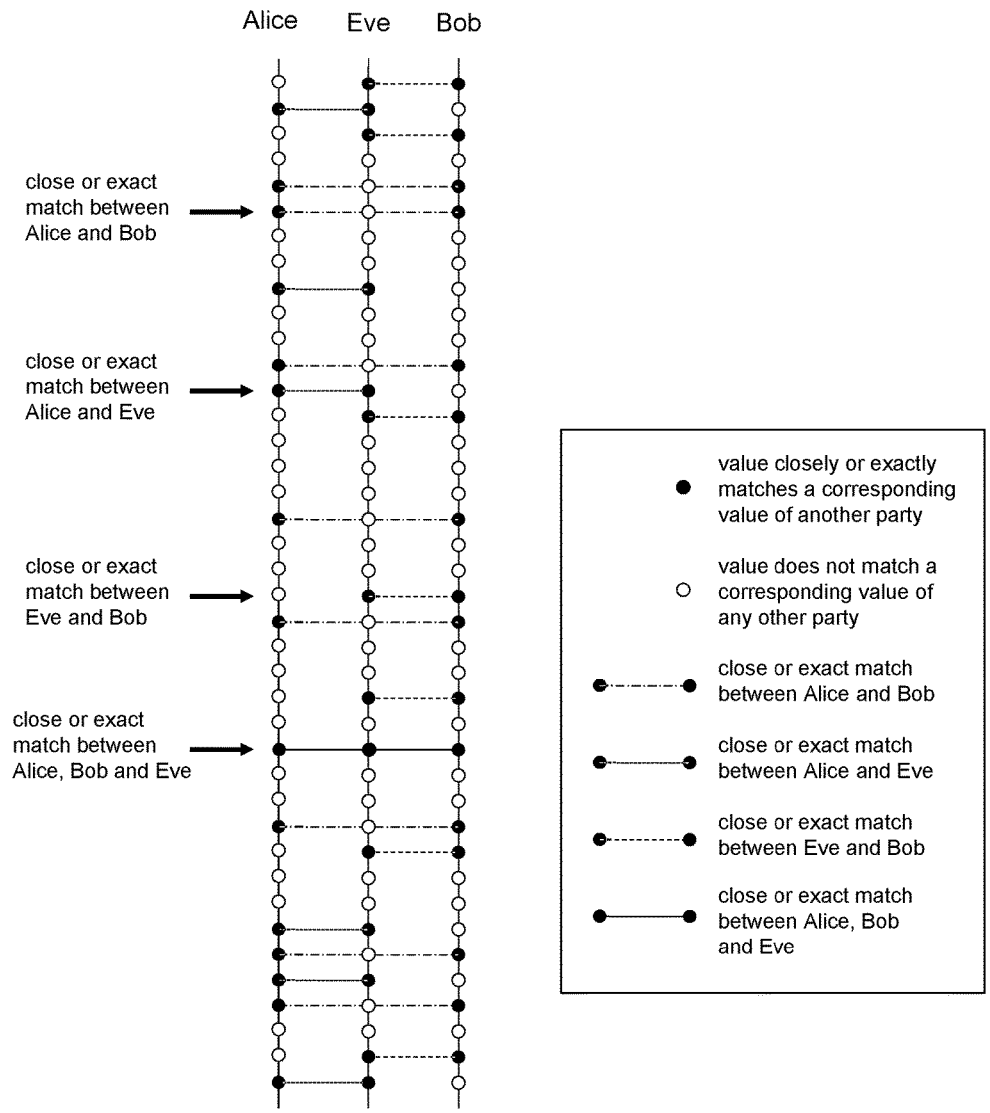
FIG. 13 illustrates the occurrence of matching corresponding values between Alice, Bob and Eve in the error correction stage shown in FIG. 5.

The occurrence of matching corresponding values between Alice, Bob and Eve is illustrated in FIG. 13. In this Figure, the three vertical lines represent the sequences $\underline{A}$, $\underline{B}$ and $\underline{E}$, and the circles represent individual values in the sequences. A solid circle represents the occurrence of a value that matches (closely or exactly) a corresponding value in at least one of the other two sequences, and a hollow circle represents a value that does not match (closely or exactly) a corresponding value in either of the other two sequences. The horizontal lines represent matches between corresponding values of the three sequences.

FIG. 13 illustrates that matches can occur between Alice and Bob, between Alice and Eve, and between Eve and Bob, but that simultaneous matching between all three of Alice, Bob and Eve occurs much less frequently than matches between any two parties. In particular, if the probability of a match between Alice and Bob is denoted $P_{A,B}$, the probability of a match between Alice and Eve is denoted $P_{A,E}$, and the probability of a three-way match between Alice, Bob and Eve is denoted $P_{A,B,E}$ then $P_{A,B,E}$ will be of the order of $P_{A,B} \times P_{A,E} < P_{A,B}$.

In the present embodiment, BCH (Bose Ray Chaudhuri) error correction is used for performing the error correction in the error correction stage. However, any other suitable technique could also be used. BCH error correction will now be briefly described. In BCH coding, a message vector, M, of size 1×k bits is multiplied by a generator matrix G of size k×n bits to generate a codeword vector C of size 1×n bits. The codeword vector C comprises a concatenation of the original 1×k bit message vector and a parity vector of size 1×(n−k) bits. The parity vector comprises parity bits, which add redundancy to the codeword and allows bit errors in the codeword C (up to a certain maximum number of errors) to be identified and corrected. The generator matrix G may be chosen to produce codewords capable of correcting a desired number of bit errors.

In order to identify and correct bit errors in a possibly corrupted codeword R of size 1×n bits (e.g. as a result of data transmission), a parity check (or decoding) matrix P of size (n−k)×n bits, corresponding to the generator matrix G, is used. The transpose of the codeword to be checked $R^T$ is pre-multiplied by the parity check matrix P to obtain a syndrome vector of size (n−k)×1 bits. The syndrome vector comprises information which allows errors to be identified and corrected. If the number of bit errors is no greater than the maximum number of errors detectable by the particular BCH code used, then the syndrome vector encodes or comprises information identifying the position of the errors, thereby allowing those errors to be corrected.

Turning to the specific steps of the error correction stage in the present embodiment, as shown in FIG. 12, in a first step 1201, the processor 425 of Bob's apparatus 415 obtains a BCH generator matrix G chosen to generate a codeword C of length n from a message M of length k. The codeword C includes n−k parity bits, and is capable of correcting up to q bit errors. In a next step 1203, the processor 413 of Alice's apparatus 401 obtains the parity check matrix P corresponding to generator matrix G. The BCH generator matrix G and the parity check matrix P may be predetermined and stored within the memories of Alice's apparatus 401 and Bob's apparatus 415. In the present embodiment, values of n=15, k=11 and q=1 are used and the generator matrix G is generated from the generator $x^m \bmod(x^4+x^3+1)$. However, it will be appreciated that these are merely examples, and that other values and generators could be used. For example, in another embodiment, n=21, k=15 and q=1.

Bob's apparatus 415 and Alice's apparatus 415 then cooperate to iteratively perform the following steps for each pair of corresponding values $\underline{a}_i$, $\underline{b}_i$ in sequences $\underline{A}$ and $\underline{B}$. Specifically, the processor 425 of Bob's apparatus 415 first uses the generator matrix G to obtain the BCH codeword for value $\underline{b}_i$ in step 1205. In a next step 1207, the transmitter unit 419 of Bob's apparatus 415 transmits the n−k parity bits of the BHC codeword for $\underline{b}_i$.

In a next step 1209, the receiver unit 409 of Alice's apparatus 401 receives the n−k parity bits transmitted by Bob's apparatus 415. In a next step 1211, the processor 413 of Alice's apparatus 401 appends the n−k parity bits received from Bob's apparatus 415 to $\underline{a}_i$ to obtain a BCH codeword for $\underline{a}_i$. If $\underline{a}_i$ and $\underline{b}_i$ are different, then the BCH codeword for $\underline{a}_i$ constructed in this way will, in general (though not always), be different than a BCH codeword for $\underline{a}_i$ generated directly using the generator matrix G since, in this case, the parity bits for $\underline{a}_i$ and $\underline{b}_i$ will, in general (though not always), be different. In a next step 1213, the processor 413 of Alice's apparatus 401 uses the parity check matrix P to obtain the syndrome vector for the BCH codeword for $\underline{a}_i$. In a next step 1215, the processor 413 of Alice's apparatus 401 corrects the value of $\underline{a}_i$ using the syndrome vector. In a next step 1217, the processor 413 of Alice's apparatus 401 replaces the original value of $\underline{a}_i$ in the sequence $\underline{A}$ with the corrected value.

The error correction procedure may be regarded as a process in which Alice's values $\underline{a}_i$ are corrected using Bob's values $\underline{b}_i$, or more specifically, using error correcting information derived from Bob's values. The result of this error correction procedure between $\underline{a}_i$ and $\underline{b}_i$ is that, if the error (Hamming distance) between $\underline{a}_i$ and $\underline{b}_i$ before the procedure was no more than q bits, then $\underline{a}_i$ will end up after the procedure being equal to $\underline{b}_i$. However, if the error between $\underline{a}_i$ and $\underline{b}_i$ before the procedure was more than q bits, then the error (Hamming distance) between $\underline{a}_i$ and $\underline{b}_i$ will tend to increase. The additional errors introduced will, on average, be evenly distributed among the slices.

In an alternative embodiment, the roles of Alice and Bob may be exchanged in the above error correction procedure.

In a next step 1219, if there are some values in $\underline{A}$ and $\underline{B}$ that remain to be processed (i.e. i<1), then the above process is carried out between the next pair of corresponding values $\underline{a}_{i+1}$, $\underline{b}_{i+1}$.

Thus, the overall result of the error correction stage is that the number of corresponding values in sequences $\underline{A}$ and $\underline{B}$ that exactly match will tend to increase, while the non-matching values (i.e. those corresponding values that originally differed by more than q bits) will tend to become less correlated.

By eavesdropping on the communication link between Alice's apparatus 401 and Bob's apparatus 415, Eve's apparatus 429 is able to intercept the parity bits transmitted by Bob's apparatus 415 to Alice's apparatus 401. However, Eve cannot use these parity bits to match her data to Alice's data and Bob's data when Alice's data and Bob's data are matched. This is because, when the error between corresponding values $\underline{a}_i$ and $\underline{b}_i$ in sequences $\underline{A}$ and $\underline{B}$ is no more than q bits (resulting in an exact match between $\underline{a}_i$ and $\underline{b}_i$ after error correction), there is only a small probability that the error between corresponding values $\underline{e}_i$ and $\underline{b}_i$ in sequences E and B will also be no more than q bits. Therefore, if Eve mirrors the process carried out by Alice, as illustrated in FIG. 12 by steps 1203e and 1209e-1219e, the result will be that, in most cases where $\underline{a}_i$ and $\underline{b}_i$ exactly match after error correction, the error between $\underline{e}_i$ and $\underline{b}_i$ is likely to increase.

Furthermore, since the number of parity bits is smaller than the number of bits in the sequence values, Eve is not able to unambiguously identify the values of $\underline{b}_i$ from the transmitted parity bits because several different sequence values map to each unique set of parity bits.

It will be appreciated that the procedure illustrated in FIG. 12 is one example of an error correction procedure that may be used in embodiments of the present invention. For example, the error correction procedure illustrated in FIG. 12 may be replaced with any suitable procedure for allowing Alice and Bob to increase the correlation between their respective sequences, while preventing Eve from increasing the correlation between her sequence and either of Alice's and Bob's sequences by at least the same degree.

For example, various error correction procedures that may be used in embodiments of the invention may comprise a first party (e.g. Bob) transmitting any suitable error correction information (e.g. the error correction information of any suitable systematic error-correcting coding scheme) to a second party (e.g. Alice), the error correction information being generated based on a value in the first party's sequence. The second party then applies the received error correction information to a corresponding value in the second party's sequence. The roles of Alice and Bob may be exchanged in certain embodiments.

By applying an error correction procedure, there is a non-zero probability of reducing the difference between a corresponding pair of values in the first and second party's respective sequences (possibly to zero). By applying the error correction to each value in the first and second party's respective sequences, there is a non-zero probability of the first and second party's sequences becoming more highly correlated.

Data Matching Agreement Stage

Figure 14:
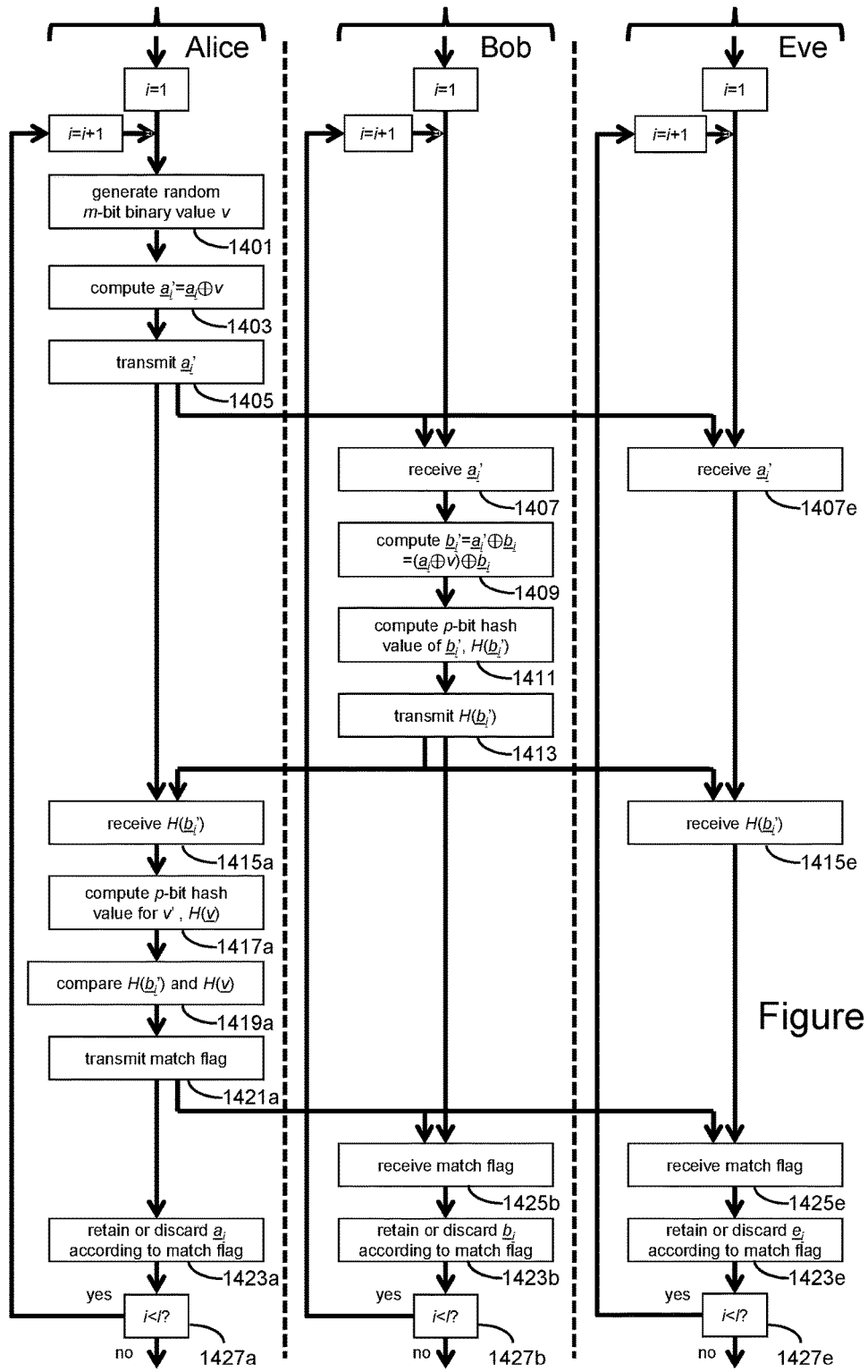
FIG. 14 is a flow diagram illustrating the various steps of the data matching agreement stage shown in FIG. 5.

The error correction stage 505 is followed by the data matching agreement stage 507, which may be also referred to as an advantage distillation stage. FIG. 14 is a flow diagram illustrating the various steps of the data matching agreement stage 507 in more detail.

This stage is for allowing Alice and Bob to identify corresponding values $a_i$, $b_i$ which match between their respective sequences $\underline{A}$ and $\underline{B}$ following the error correction stage. This allows Alice and Bob to extract the highly correlated subset of values from their sequences, while discarding the remaining less correlated values. As shown in FIG. 14, the following method steps are iteratively performed for each pair of corresponding values $a_i$, $b_i$ in the data sequences $\underline{A}$ and $\underline{B}$. In a first step 1401, the processor 413 of Alice's apparatus 401 generates a random m-bit binary value, denoted v. In a next step 1403, the processor 413 of Alice's apparatus 401 computes a new m-bit binary value $a_i'=a_i \oplus v$, where $\oplus$ denotes bit-wise modulo-2 addition. In a next step 1405, the transmitter unit 407 of Alice's apparatus 401 transmits the value $a_i'$.

In a next step 1407, the receiver unit 421 of Bob's apparatus 415 receives the value $a_i'$ transmitted by Alice's apparatus 401. In a next step 1409, the processor 425 of Bob's apparatus 415 computes a new m-bit value $b_i'=a_i' \oplus b_i=(a_i \oplus v) \oplus b_i$. At this time, if Alice's and Bob's data values match (i.e. if $a_i=b_i$) then $b_i'=v$.

In order to verify whether $b_i'=v$, in a next step 1411, the processor 425 of Bob's apparatus 415 computes a p-bit hash value from the value $b_i'$, $H(b_i')$, where p<m, using a predetermined hashing algorithm $H(\cdot)$. In the present embodiment, the hash value comprises the parity bits of a BCH codeword for $b_i'$ generated using a BCH generator matrix. For example, the BCH generator matrix may be the same one as that used in the error correction stage described above. In other embodiments, any other suitable function for computing a p-bit output value from an m-bit input value, where p<m, may be used. In a next step 1413, the transmitter unit 419 of Bob's apparatus 415 transmits the hash value $H(b_i')$.

In a next step 1415, the receiver unit 409 of Alice's apparatus 401 receives the hash value $H(b_i')$ transmitted by Bob's apparatus 415. In a next step 1417, the processor 413 of Alice's apparatus 401 computes a p-bit hash value $H(v_i)$ from the value v using the same hashing algorithm $H(\cdot)$ as used by Bob's processor 425. In a next step 1419, the processor 413 of Alice's apparatus 401 compares the hash value $H(v_i)$ computed by the processor 413 of Alice's apparatus 401 and the hash value $H(b_i')$ received from Bob. In a next step, if the processor 413 of Alice's apparatus 401 determines a match between the hash values then it is assumed that $b_i'=v$ and the transmitter unit 407 of Alice's apparatus 401 transmits 1421a signal for indicating whether or not $b_i'=v$, and hence whether or not $a_i=b_i$.

In the embodiment illustrated in FIG. 14, the confirmation signal comprises a match flag signal that is transmitted at every iteration, regardless of whether or not there is a match, and which indicates either "match" or "no match". In another embodiment, the confirmation signal is transmitted only when there is a match. In this case, receipt of the confirmation signal may indicate a match while failure to receive a confirmation may indicate no match.

In a next step 1423, the processor of Alice's apparatus retains or discards $a_i$, and the processor 425 of Bob's apparatus 415 retains or discards $b_i$, according to the received 1425b confirmation signal. In particular, if the confirmation signal indicates that $a_i=b_i$ then the memory 405 of Alice's apparatus 401 stores the value $a_i(=b_i)$, and the memory 417 of Bob's apparatus 415 stores the value $b_i(=a_i)$. On the other hand, if the confirmation signal indicates that $a_i \neq b_i$, then the values $a_i$ and $b_i$ are discarded by Alice's apparatus 401 and Bob's apparatus 415.

In a next step 1427, if there are some values in $\underline{A}$ and $\underline{B}$ that remain to be processed (i.e. i<1), then the above process is carried out between the next pair of corresponding values $a_{i+1}$, $b_{i+1}$. If all values in $\underline{A}$ and $\underline{B}$ have been processed, the data matching agreement stage ends.

In an alternative embodiment, the roles of Alice and Bob may be exchanged in the above data matching agreement procedure.

During the data matching agreement stage, the sequences $\underline{A}$ and $\underline{B}$ will be reduced in length from length l to length $l_0<l$ due to the discarding of some of the original values. However, Alice's sequence and Bob's sequence become more highly correlated, while the correlation between Eve's sequence and both Alice's and Bob's sequences is reduced.

In the above described process, Eve may eavesdrop on the communication link between Alice and Bob and obtain certain values that are transmitted during the process, including the value $a_i'$ transmitted by Alice, the hash value $H(b_i')$ transmitted by Bob and the confirmation signal transmitted by Alice. However, none of these values allows Eve to obtain useful information.

For example, assuming the value v used to generate the value $a_i'$ is completely random and kept secret by Alice, then knowing $a_i'$ will not provide Eve with any information about the value $a_i$. Furthermore, since the number of bits in the hash values generated by the hash function $H(\cdot)$ is smaller than the number of bits in the data values from which the hash values are generated, this means that the hash function $H(\cdot)$ maps multiple data values to each unique hash value. Therefore, a hash value $H(b_i')$ cannot be used by Eve to reliably determined the specific data value $b_i'$. In addition, although the confirmation signals allow Eve to determine those positions in the sequences $\underline{A}$ and $\underline{B}$ at which Alice and Eve have determined a match, the actual data values, $a_i$, $b_i$ at those sequence positions will remain unknown to Eve since Eve's corresponding data values, $e_i$, at those positions will, in general, be different from Alice's and Bob's data values, $a_i$, $b_i$.

In the process described above, if the hash values $H(v_i)$ and $H(b_i')$ match then it is assumed that $b_i'=v$, and hence $a_i=b_i$. However, as previously mentioned, since the number of bits in the hash values generated by the hash function $H(\cdot)$ is smaller than the number of bits in the data values from which the hash values are generated, this means that the hash function $H(\cdot)$ maps multiple data values to each unique hash value. This means that it is possible for $H(v_i)$ and $H(b_i')$ to match even if $b_i'$ and v (and hence $a_i$ and $b_i$) are different. Therefore, after performing the data matching agreement stage, although the number of matching corresponding values between sequences $\underline{A}$ and $\underline{B}$ will have increased, there may still be some corresponding values that do not match exactly.

In the illustrated embodiment, Alice and Bob retain or discard $a_i$, and $b_i$ according to the confirmation signal. In an alternative embodiment, Alice and Bob discard $a_i$, and $b_i$ irrespective of the confirmation signal. However, in this case, if the confirmation signal indicates that $a_i=b_i$ then Alice and Bob instead retain the value v. This value is known to Alice, and can be computed by Bob using the received value $a_i'$ together with the value $b_i$ (which, in the case of a match, is equal to $a_i$). In other words, Alice and Bob may replace the original values, $a_i$ and $b_i$, with the respective random values v when the original values match (in this case, the values may still be denoted by $a_i$ and $b_i$). In some embodiments, the discarded values of $a_i$ and $b_i$ may be used as, or in place of, random values required in subsequent stages of the protocol, including any repetitions of the data matching procedure.

Thus, in this case, it can be seen that, although the shared secret information is derived using the matching values in sequences A and B (e.g. in the above example, knowledge of the matched values allows the random values that form the secret information to be derived), the shared secret information is extracted, not directly from the sequences A and B themselves, but from a different data set (e.g. a sequence of random values). It will be appreciated that the present invention encompasses techniques in which the shared secret information is extracted or derived directly from the sequences A and B (or a subset thereof), but also techniques in which the shared secret information is extracted or derived from a different data set (or subset thereof).

Figure 15:
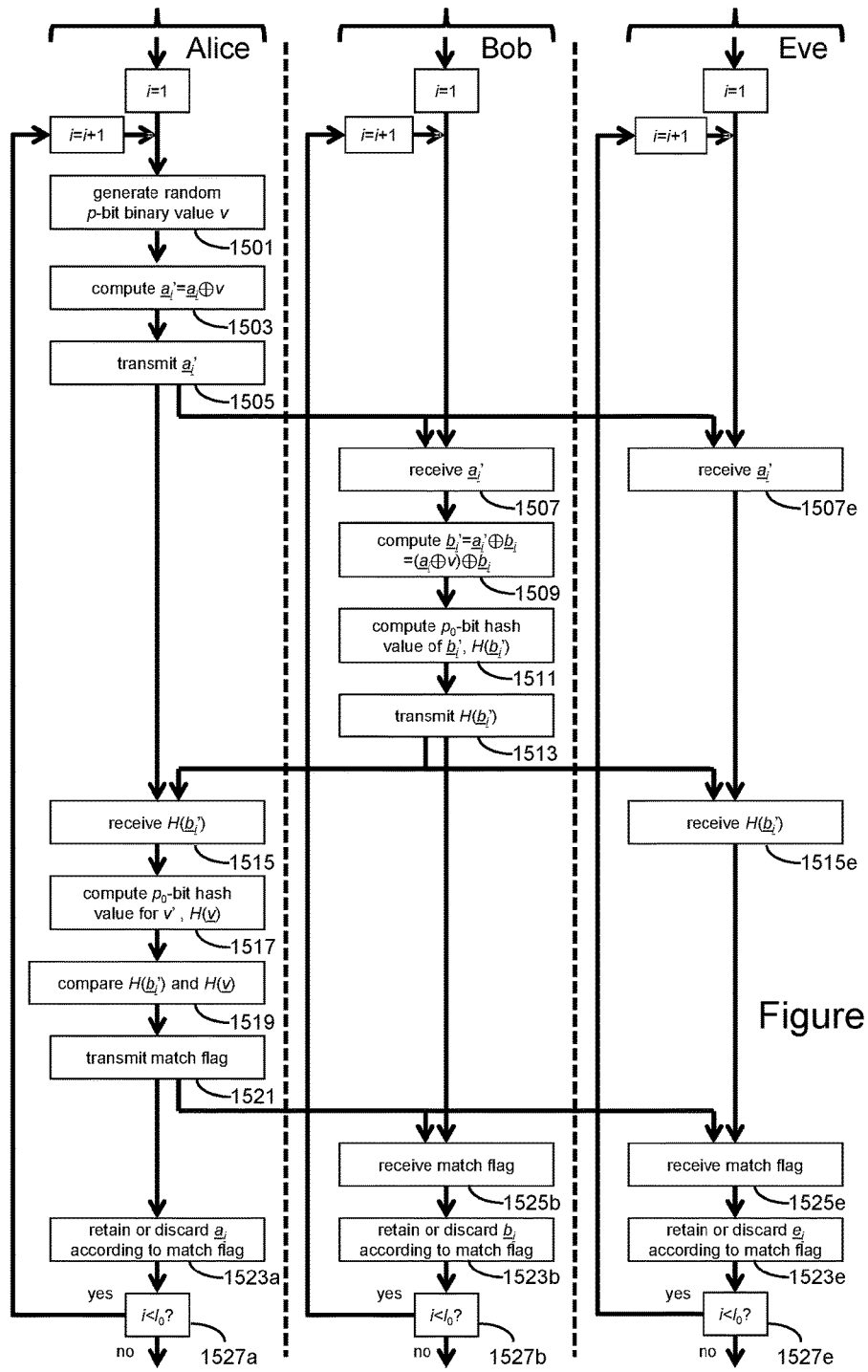
FIG. 15 is a flow diagram illustrating the various steps of the security enhancement stage shown in FIG. 5.

It will be appreciated that the procedure illustrated in FIG. 15 is one example of a data matching procedure that may be used in embodiment of the present invention. For example, the data matching procedure illustrated in FIG. 15 may be replaced with any suitable procedure such that, when Alice and Bob know respective values a and b but not each other's values, Alice and Bob can each determine respective values a' and b' such that a'=b' with a probability above a certain level, without Eve gaining knowledge of a' and b' when a'=b'.

Figure 16A:
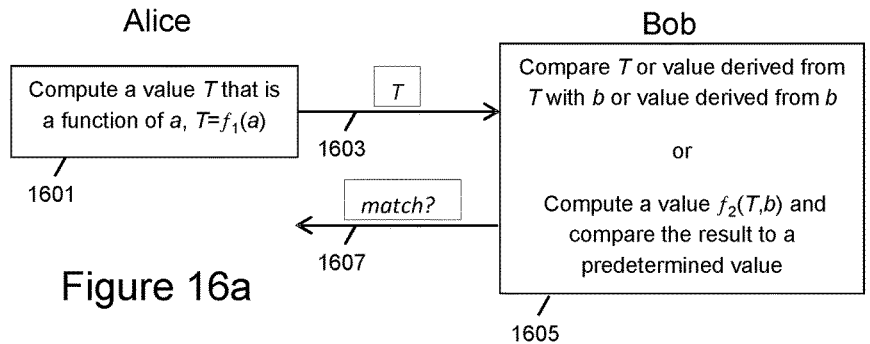
FIGS. 16a, 16b and 16c illustrate various examples of data matching procedures that may be used in embodiments of the invention.
Figure 16B:
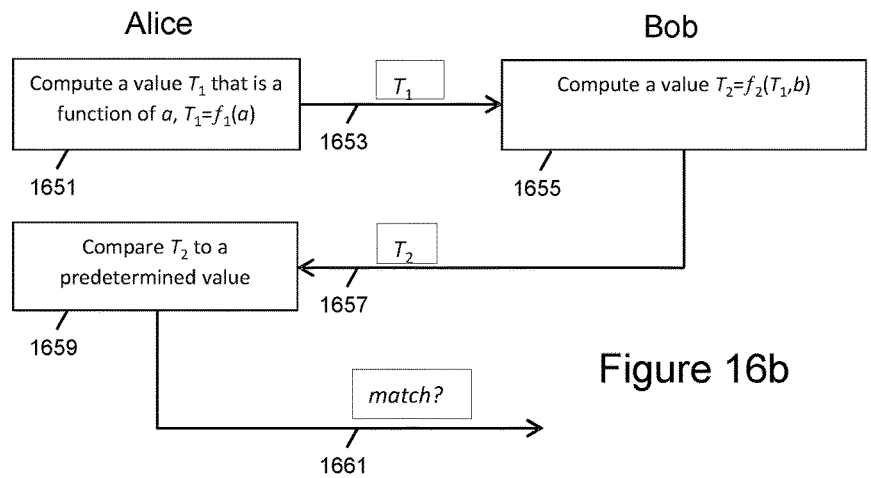
Figure 16C:
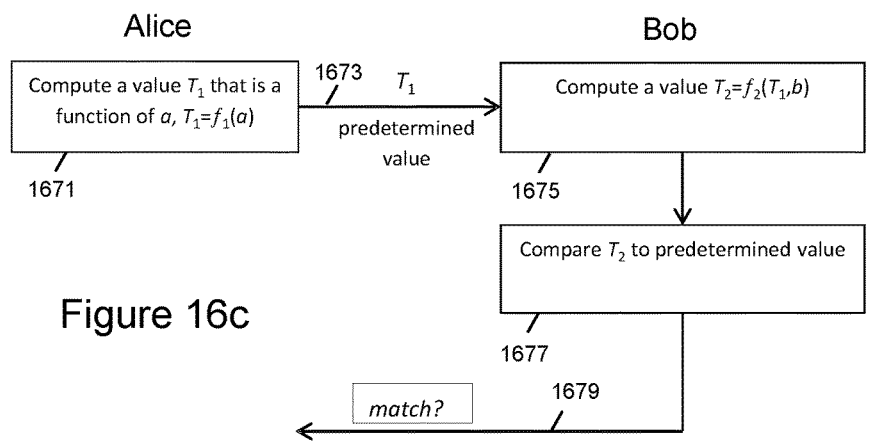

FIGS. 16a, 16b and 16c illustrate various examples of data matching procedures that may be used in embodiments of the invention.

In the example illustrated in FIG. 16a, in a first step 1601, Alice computes a value T that is a function of a, T=$f_1$(a). In a next step 1603, Alice transmits the value T to Bob. The function $f_1$ is chosen such that the value of a cannot be reliably derived from the value of $f_1$(a) so that Eve cannot gain perfect knowledge of a by intercepting the transmission to discover T. For example, the function $f_1$ may comprise a secure encryption function, a masking function, or a hash function. In a next step 1605, Bob compares T or a value derived from T with b or a value derived from b. For example, Bob may compare T with $f_1$(b) or compare $f_1^{-1}$(T) with b, where $f_1^{-1}$ denotes the inverse function of $f_1$. For example, in the case that $f_1$ is a hash function, Bob computes a hash value from b and compares his hash value with the hash value received from Alice. Alternatively, in step 1605, Bob computes a value $f_2$(T,b) and compare the result to a predetermined value. For example, Bob may compare T−$f_1$(b) with 0. In a next step 1607, Bob transmit a message to Alice indicating a match or no match according to the result of the comparison. For example, the message may comprise a one-bit flag. Alice and Bob retain their respective values, a and b only if a message indicating a match is transmitted.

In the example illustrated in FIG. 16b, in a first step 1651, Alice computes a value $T_1$ that is a function of a, $T_1$=$f_1$(a). In a next step 1653, Alice transmits the value $T_1$ to Bob. In a next step 1655, Bob compute a value $T_2$=$f_2$($T_1$,b). In a next step 1657, Bob transmit the value $T_2$ to Alice. In a next step 1659, Alice compares $T_2$ to a predetermined value. In a next step 1661, Alice transmits a message (e.g. 1-bit flag) to Bob indicating a match or no match according to the result of the comparison. Alice and Bob retain their respective values, a and b only if a message indicating a match is transmitted. The function $f_1$ is chosen such that the value of a cannot be reliably derived from the value of $f_1$(a), while the function $f_2$ is chosen such that the values of b cannot be reliably derived from the value of $f_2$($T_1$, b). In addition, the functions $f_1$ and $f_2$ may be chosen such that, if a=b, then the value of $T_2$ is independent of at least b and in some examples, may also be independent of a. In one specific example, $f_1$(a)=a⊕r where r is a random number, for example generated by and, at least initially, known only to Alice, ⊕ denotes modulo-2 addition, and $f_2$($T_1$,b)=H($T_1$⊕b) where H is a hash function, or any other suitable function for computing an output value from an input value such that the input value cannot be reliably derived from the output value. In this example, upon receiving $T_2$, Alice compares $T_2$ to H(r) (which in this example corresponds to the predetermined value).

In the example illustrated in FIG. 16c, in a first step 1671, Alice computes a value $T_1$ that is a function of a, $T_1$=$f_1$(a). In a next step 1673, Alice transmits the value $T_1$ to Bob. In step 1673, or in a separate step, Alice also transmits a predetermined value to Bob. In a next step 1675, Bob compute a value $T_2$=$f_2$($T_1$,b). In a next step 1677, Bob compares $T_2$ to the predetermined value received from Alice. In a next step 1679, Bob transmits a message (e.g. 1-bit flag) to Alice indicating a match or no match according to the result of the comparison. Alice and Bob retain their respective values, a and b, only if a message indicating a match is transmitted. The function $f_1$ is chosen such that the value of a cannot be reliably derived from the value of $f_1$(a). In one specific example, $f_1$(a)=a⊕r where r is a random number, the predetermined value transmitted by Alice is H(r), and $f_2$($T_1$,b)=H($T_1$⊕b) where H is a hash function, or any other suitable function for computing an output value from an input value such that the input value cannot be reliably derived from the output value.

The procedures illustrated in FIGS. 16a, 16b and 16c may be repeated for each pair of values $a_i$, $b_i$ in a sequence of pairs of values i=0, 1, 2, . . . .

Figure 17:
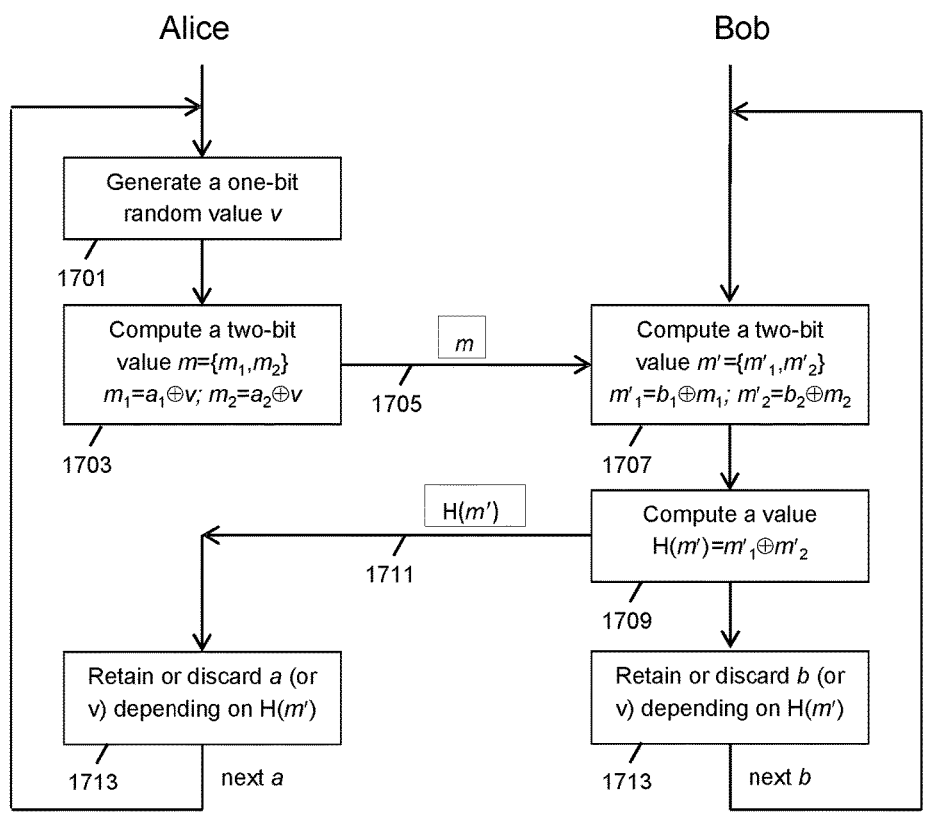
FIG. 17 illustrates a further example of a data matching procedure that may be used in embodiments of the invention.

FIG. 17 illustrates a further example of a data matching procedure that may be used in embodiments of the invention. In this example, a and b are two bits in length, where the individual bits of a may be denoted $a_1$ and $a_2$, while the individual bits of b may be denoted $b_1$ and $b_2$. If Alice's and Bob's values are larger than two bits in length, then the values may be divided into two-bit portions.

In a first step 1701, Alice generates a one-bit random value v. In a next step 1703, Alice computes a two-bit value m, where the individual bits of m may be denoted $m_1$ and $m_2$, and are computed as $m_1$=$a_1$⊕v and $m_2$=$a_2$⊕v, where ⊕ denotes modulo-2 addition. In a next step 1705, Alice transmits the value m to Bob. In a next step 1707, Bob computes a two-bit value m', where the individual bits of m' may be denoted $m'_1$ and $m'_2$, and are computed as $m'_1$=$b_1$⊕$m_1$ and $m'_2$=$b_2$⊕$m_2$. In a next step 1709, Bob computes a value H(m')=$m'_1$⊕$m'_2$. It can be seen that, if a=b (i.e. if $a_1$=$b_1$ and $a_2$=$b_2$), then $m'_1$=$m'_2$=v, and hence H(m')=0. In a next step 1711, Bob transmits the value of H(m') to Alice. In a next step 1713, if the transmitted value H(m')=0 then Alice and Bob retain their respective values, a and b, otherwise Alice and Bob discard their respective values, a and b.

In the example described above, in step 1713, Alice and Bob retain or discard their respective values, a and b, depending on the transmitted value of H(m'). In an alternative embodiment, in step 1713, if the transmitted value H(m')=0 then Alice instead retains the value v and Bob instead retains the value $m'_1$=$m'_2$=v, otherwise the values are discarded. In other words, if H(m')=0 then Alice and Bob replace their respective original values, a and b, with v. Since the value v is only one bit in length, whereas values a and b are two bits in length, this will result in a reduction in the size of data, by a factor of 2.

The procedure described above may be repeated for each pair of values $a^{(i)}$, $b^{(i)}$ in a sequence of pairs of values i=0, 1, 2, . . . using a different random value v for each iteration (value of i).

In the example described above, if H(m')=0, then it is assumed that a=b, even though, in some cases, H(m')=0, even if a≠b (for example, if $a_1 \neq b_1$ and $a_2 \neq b_2$). However, since there is a non-zero probability that a=b if H(m')=0, but a zero probability that a=b if H(m')≠0, then by retaining values a and b when H(m')=0 and discarding the values otherwise, Alice and Bob increase their information overlap. In particular, Alice's and Bob's certainty that their respective (retained) values match following this procedure is higher than the certainty that their respective original values match before the procedure.

Thus, as described further below, by repeating the data matching procedure described above (e.g. repeating the procedure using the sequence of values retained in the preceding pass), it is possible for Alice and Bob to increase their information overlap to any desired arbitrary level. For example, when an individual pass of the procedure described above is completed for each pair of values in the sequences of pairs of values $a^{(i)}$, $b^{(i)}$, then the resulting bit streams, formed from the retained values, may be divided in groups of two bits and the procedure may be repeated for a further pass. In some embodiments, the values of $a^{(i)}$, $b^{(i)}$ in a preceding pass may be used as the random value v in the next pass.

Figure 18:
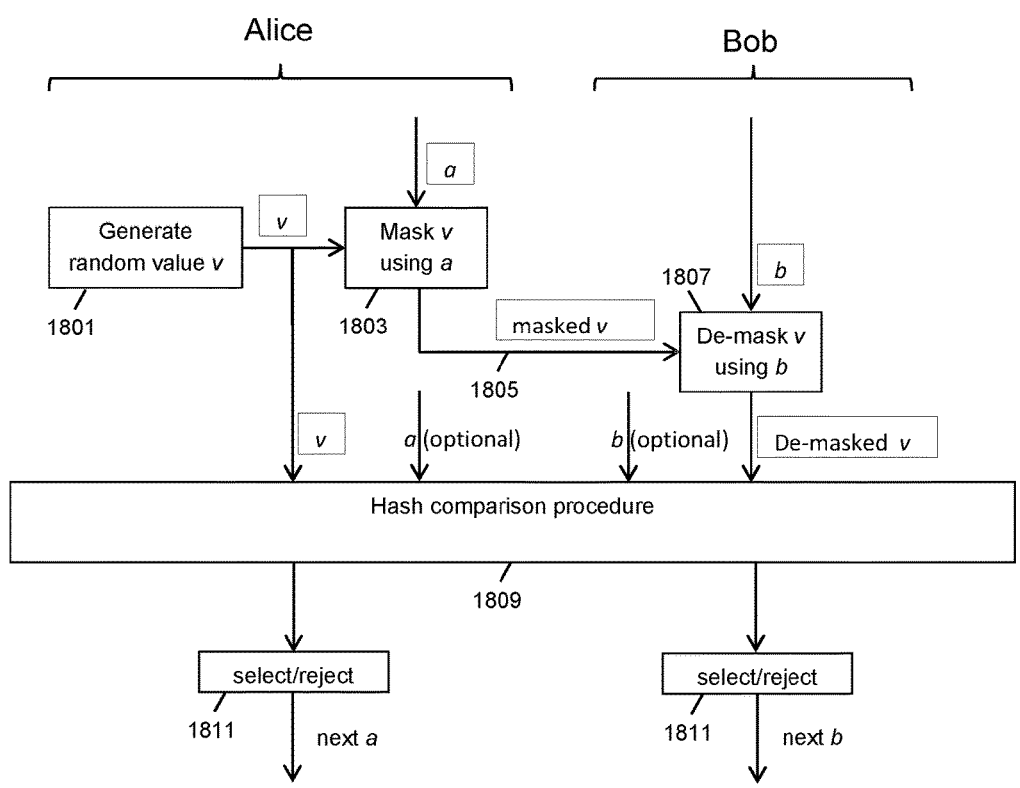
FIG. 18 illustrates yet a further example of a data matching procedure that may be used in embodiments of the invention.

FIG. 18 illustrates yet a further example of a data matching procedure that may be used in embodiments of the present invention. In a first step 1801, Alice generates a random value v. In a next step 1803, Alice masks the random value v using Alice's value a. The masking may be performed, for example, using a bitwise modulo-2 addition operation. In a next step 1805, Alice transmits the masked value to Bob. In a next step 1807, Bob attempts to de-mask the received masked value using Bob's value b. The de-masking may be performed, for example, by using a bitwise modulo-2 addition operation. In a next step 1809, Alice and Bob exchange one or messages to perform a hash comparison procedure. For example, the hash comparison procedure may comprise steps including: generating, by one or both of Alice and Bob, one or more hash values; transmitting one or more of the generated hash values between Alice and Bob; and performing, by one or both of Alice and Bob, a comparison using the hash values. The hash comparison procedure may be carried out publicly, i.e. the messages transmitted between Alice and Bob as part of the procedure may be intercepted by Eve. In a next step 1811, Alice and Bob accept or reject their respective values a and b, according to a result of the hash comparison procedure. In a next step, the overall procedure is repeated for the next pair of values, a and b.

As will be appreciated from the above, a wide variety of data matching algorithms may be used in embodiments of the present invention. It will be appreciated that the data matching algorithm in certain embodiments may comprise any suitable reconciliation or reverse-reconciliation protocol.

In the present embodiment, further stages are performed in order to further increase the overlap between Alice and Bob, while reducing the information overlap between Eve and Alice/Bob. However, for some applications, the sequences obtained by Alice and Bob at the end of the data matching agreement stage may be sufficiently matched, and may be sufficiently secret. Therefore, in some embodiments, the protocol may end following the data matching agreement stage and the sequences A and B used as the shared secret information. Alternatively, one or more of the following stages may also be optionally performed.

In some embodiments, the error correction stage and/or the data matching agreement stage may be repeated one or more time. In some embodiments, these stages may be repeated using the same procedures or algorithms. However, in other embodiments, one or more different procedures or algorithms may be applied when the stages are repeated.

First Privacy Amplification Stage

The data matching agreement stage 507 is followed by a first privacy amplification stage 509 for reducing the information overlap between Eve and Alice/Bob further. A potential information overlap between Eve and Alice/Bob results from the fact that, during the data matching agreement stage, there may have been a relatively small number of corresponding sequence values that matched between all three of Alice, Bob and Eve. Furthermore, while Eve cannot use the p-bit hash values H($b'_i$) to reliably determine the exact data values $b'_i$, the hash value H($b'_i$) still provides Eve with some information, which, if accumulated over the protocol, potentially provides Eve with p bits of information on the m-bit values $b'_i$.

Therefore, in order to enhance secrecy even further and reduce the correlation between E and A/B, in the present embodiment, only a subset of the slices of each of the sequences A and B may be retained by Alice and Bob. For example, since the correlation between sequence slices is different for each slice, in certain embodiments, only a subset of the slices having the lowest correlation may be retained. In the present embodiment, only the p highest slices of A and B (corresponding to the p least significant bits) are retained by Alice and Bob. Thus, the number of bits in each of the $l_0$ values $a_i$, $b_i$ in sequences A and B is reduced from m to p. In the present embodiment, a value of p=4 is used.

In the case that the data discretisation stage 503 described above was not performed, data slicing may still be performed in order to allow the first privacy amplification stage 509 to be performed.

As described above, each slice of sequence B may be regarded as the result of transmitting the corresponding slice of sequence A through a first binary symmetric channel with a particular error probability, denoted s. Similarly, each slice of sequence E may be regarded as the result of transmitting the corresponding slice of sequence A through a second binary symmetric channel with a particular error probability, denoted δ. The values of ε and δ will differ for each slice.

The secret capacity of a channel between Alice and Bob is the maximum rate at which Alice can reliably send information to Bob such that the rate at which Eve obtains this information is arbitrarily small. The secret capacity of a binary symmetric channel between Alice and Bob as described above is given by Equation 9 below.

$$C = h(\varepsilon + \delta 2\varepsilon\delta) - h(\varepsilon)$$

$$h(\rho) = -\rho \log_2(\rho) - (1-\rho)\log_2(1-\rho) \quad \text{Eq. 9}$$

In Equation 9, C is the secret capacity, ε is the error probability of the binary symmetric channel between Alice and Bob, δ is the error probability of the binary symmetric channel between Alice and Eve, and h is the binary entropy function. The secret capacity C is strictly positive unless ε=½ or δ=0 or 1.

It is possible to analyse, for example using numerical simulation, the secret capacity with respect to each slice in a communication system given the data slicing scheme used and the levels of noise present. In a communication system in which 16 slices are used, in which Eve uses an ideal detector limited only by shot noise, and in which Bob's detector introduces a relatively high level of noise, under certain conditions, it is observed that the secret capacity may actually be highest in the lowest numbered slices, corresponding to the most significant bits and the slices with the lowest error rate. Conversely, the secret capacity may be lowest in the highest numbered slices, corresponding to the least significant bits and the slices with the highest error rate.

Therefore, in some embodiments, a subset of the slices having among the highest secret capacity may be retained. For example, when using 16 slices, a single bit from the first to the fifth most significant bits may be retained from each value of sequences $\underline{A}$ and $\underline{B}$.

After the first privacy amplification stage, the number of bits in each of the $l_0$ values $\underline{a}_i$, $\underline{b}_i$ in sequences $\underline{A}$ and $\underline{B}$ is reduced from m to $m_0$, where $m_0$ is the number of retained bits in each value. The resulting set of bits in each of sequences $\underline{A}$ and $\underline{B}$ may be divided into sequential groups of bits for the following steps of the protocol.

Security Enhancement Stage

The first privacy amplification stage 509 is followed by a security enhancement stage 511, which may also be referred to as an error reduction stage. FIG. 15 is a flow diagram illustrating the various steps of the security enhancement stage 511 in more detail.

This stage is for enhancing the security of sequences $\underline{A}$ and $\underline{B}$ obtained by Alice and Bob after the first privacy amplification stage. In the illustrated embodiment, the steps of the security enhancement stage (steps 1501-1527) are similar to the steps of the data matching agreement stage 507 except that (i) the data values, $\underline{a}_i$, $\underline{b}_i$, being processed are each p bits in length rather than m bits, (ii) the number of values in sequences A and B is equal to $l_0$ rather than l, (iii) the random value v used is p bits in length instead of m bits, and (iv) the hash algorithm H(•) generates a $p_0$-bit hash value from a p-bit input value, where $p_0<p$. In the present embodiment, the hash values comprises the parity bits of a BCH codeword for $\underline{b}_i'$; generated using a BCH generator matrix G generated from the polynomial generator $1+x^2+x^3$.

Second Privacy Amplification Stage

The security enhancement stage 511 is followed by a second privacy amplification stage 513 for reducing the information overlap between Eve and Alice/Bob even further.

In this stage, each p-bit value, $\underline{a}_i$, $\underline{b}_i$ in sequences $\underline{A}$ and $\underline{B}$ are replaced by the parity of each value. The parity of a value is determined to be 1 if the value has an odd number of 1-bits, and is determined to be 0 otherwise. Thus, even if Eve knows the hash values exchanged between Alice and Bob, Eve will not be able to determine the exact value used to generate the hash value. This is because the hashing function H(•) maps several p-bit values map to each unique $p_0$-bit hash value. Furthermore, when the hashing function H(•) is selected appropriately, the p-bit data values mapped to each $p_0$-bit hash value may have different parities (i.e. the p-bit data values may differ in an odd number of bits). For example, this is the case when using the parity bits of the BCH code as described above. Therefore, the parity of a data value is completely ambiguous from the hash value of that data value. Thus, by replacing each data value with its parity, the information overlap between Eve and Alice/Bob can be reduced to a very low level, and possibly substantially zero.

Stage Iterations

The security enhancement stage 511 and the second privacy amplification stage 513 described above may be repeated any number of times to iteratively reduce the errors between $\underline{A}$ and $\underline{B}$ and to iteratively reduce the information overlap between Eve and Alice/Bob. In this case, the parity bits obtained in the immediately preceding iteration are divided into sequential groups of p bits for the next iteration. The sequence of parity bits obtained at the end of the final iteration form the final bit stream that comprises the secret information obtained by Alice and Bob.

It will be appreciated that one or more of the stages described above may be omitted from the overall protocol in some embodiments of the present invention. However, this may result in a reduction in overall security.

Simulation Results

Table 1 below shows how the mutual information values I(A; B), I(A; E), I(B; E), LB=I(A; B)−I(A; E) and UB=I(A; B|E) change throughout an exemplary simulation of the above-described protocol. Table 1 also shows how the number of bits changes throughout the protocol. LB is a secret key lower bounds and UB is the information upper bound. The row labelled Initial Data indicates values upon completion of the data discretisation stage 503. The row labelled Reconciliation indicates values upon completion of the error correction (or reconciliation) stage 505. The rows labelled $1^{st}$, $2^{nd}$ and $3^{rd}$ AD rounds indicate values upon completion of successive iterations of the security enhancement stage 511 and second privacy amplification stage 513. In this example, the initial data consists of 15000 values of 11 bits each, making 165000 bits in total.

These results show that, initially, the information overlap between Alice and Bob is actually lower than the information overlap between Bob and Eve. However as the protocol progresses, the information overlap between Alice and Bob rapidly increases to 1 (indicating an exact match between Alice and Bob), while the information between Eve and Alice/Bob rapidly decreases to substantially zero (indicating that Alice and Bob have achieved total secrecy). The number of bits decreases as the protocol progresses due to the discarding of certain values and slices.

TABLE 1

|  | I(A; B) | I(A; E) | I(B; E) | LB | UB | Bits |
|---|---|---|---|---|---|---|
| Initial Data | 0.0433 | 0.0588 | 0.0440 | −0.015 | 0.025 | 16500 |
| Reconciliation | 0.0342 | 0.351 | 0.0347 | −0.001 | 0.023 | 16500 |
| $1^{st}$ AD round | 0.186 | $8 \times 10^{-5}$ | $8 \times 10^{-8}$ | 0.186 | 0.186 | 6024 |
| $2^{nd}$ AD round | 0.810 | $7 \times 10^{-4}$ | $8 \times 10^{-8}$ | 0.186 | 0.186 | 1658 |
| $3^{rd}$ AD round | 1 | $2 \times 10^{-4}$ | $2 \times 10^{-4}$ | 0.999 | 0.999 | 520 |

Attacks

In the following, a number of eavesdropping attacks that might be used by Eve to attempt to obtain the secret information shared between Alice and Bob are discussed, together with how a protocol according to the present invention is resistant to these attacks.

As described above, the communication link between Alice and Bob may form a private channel used to exchange the initial data, and a public channel, which may be an error corrected authenticated channel, for performing the subsequent signalling necessary to obtain shared secret information. In a first class of attacks, Eve is considered to be able to intercept and read all transmission on both the public and private channels, but does not tamper or otherwise interfere with the transmissions (i.e. Eve is a passive eavesdropper). In certain embodiments of the present invention, for example those employing a free-space microwave channel, it may not be practically possible to intercept a transmission and reinsert a new one. However, even if this is not the case, embodiments of the present invention are still secure.

In other classes of attacks, Eve may be regarded as being capable of tampering or interfering with transmissions in the private channel (but not the public channel) by removing, inserting or modifying the signals (i.e. active attacks). Examples of such classes of attacks include "tampering" and "blinding" attacks. A protocol according to the present invention is resistant to these and other attacks.

In a tampering attack, Eve can tamper with the private channel transmissions, for example by suppressing the transmission of selected symbols (values), by inserting new symbols, or by intercepting and resending a part or whole of the entire message with modified encoding. Eve can also introduce any amount of noise to the transmissions. In this example, it is assumed that Eve knows the sequence of values sent to Bob but does not know either the sequence detected by Alice or the sequence detected by Bob better than an accuracy determined by the SNR of their detection apparatus.

In the protocol described above, Alice locally may be regarded as having effectively created a mapping function that maps an N bit binary value to a K bit binary value, e: $\{0,1\}^N \rightarrow \{0,1\}^K$, where K<N. In the attack, Eve creates a local tampering function t which combines an N bit binary value and a ω bit binary values to produce a modified N bit binary value, t: $\{0,1\}^N \times \{0,1\}^\omega \rightarrow \{0,1\}^N$. Alice and potentially Eve know K and e, but only Eve knows t.

Alice holds a value x derived from the transmission to Bob which is also intercepted by Eve. Eve learns the value of e(x) and forwards the corrupted value y=t(x,R) to Bob, where R is an unknown local noise variable added by Bob's detector (and any additional unknown transmission channel noise). Eve's knowledge of x consists in knowledge of e and e(x). Eve's knowledge of y consists in knowledge of e and e(x) and the choice of t. Eve has no knowledge about R. (As will be described further below, in certain cases, Eve could choose a function t that does not take R into account. This type of attack is referred to as a blinding attack.)

One attack that Eve can use is signal tampering by removing or adding symbols. This type of attack is detectable if Bob returns a random sample of the data to Alice. Uncorrelated data is detectable by looking at a data correlation map, where it shows up as incoherent noise. However, as described below, since Eve does not know the exact nature of Alice's data or Bob's data, this attack does not increase her knowledge of the secret information.

Bob creates an error correction code C(y) which is forwarded to Alice who incorporates it, for example, into a BCH code xC(y). Alice uses the BCH code to create a new variable x' which represent a q (e.g. single) bit correction to x. Then, x'=x if and only if x=y. or there is a single bit difference between x and y. All other errors increase the difference between Alice and Bob. Alice and Bob have chosen their local noise (the function e and error rate R) such that Eve cannot know y from her knowledge of e, t or C(y) because of the large collision rate (i.e. many different values of y produce the same value C(y)).

Signal tampering by a more subtle attack of adding small shifts to the continuous variable symbols (e.g. by selectively amplifying sections of the transmitted signal) introduces new bit errors into the data discretisation (e.g. data slicing) stage, and, as mentioned above, errors of more than one bit actually increase the difference between Alice and Bob. In the data matching agreement (advantage distillation) stage, Alice and Bob filter their data for matches, for example using a virtual channel, to exchange a random variable and a hash value (e.g. BCH code) to check the validity of the random variable exchanged. The local noise introduced by Alice and Bob has the effect of randomising the location of errors introduced by Eve, thereby limiting her information about C(y). As increased single bit errors have a higher probability of being rejected at this stage, Eve's tampering is detectable in a reduced data rate. While Eve is detectable, Eve is not given any information.

Turning now to the blinding attack, Eve manufactures a new signal $E_0 = WX_0 + R_E$, where W is an amplification factor and $R_E$ is added Gaussian noise to simulate detector noise. This attack relies on the fact that Bob adds detector noise at his end, and, for example, due to operating the detector with a very small input signal, the data received will have a significant noise level. The signal amplification W is set to such a level that is above the normal detector noise, so that I(B; E)≈1. Since Eve may also know the data slicing capability, Eve may actually reach substantially complete overlap with Bob. Eve has now manufactured a signal function y=t(x) independent of R and may have matched Bob's signal precisely.

There are at least two ways in which a protocol according to the present invention can resist this type of attack. First, Alice may transmit a signal that Bob can receive with very low noise. Bob uses two detectors. The first is used to detect the raw signal and the second is used detect the signal after an attenuation stage that allows his detector to add local noise. Bob then sends a random selection of the raw data to Alice (or Alice can send the initial seed data to Bob) using an error corrected and trusted channel. Second, Bob may use a carefully calibrated detector and continuously monitor for a signal that exceeds a predetermined local SNR.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the scope of the invention, as defined by the appended claims.

The invention claimed is:

1. A method for allowing a first apparatus and a second apparatus to obtain shared secret information, the method comprising the steps of:

receiving, by the first apparatus, a first signal comprising a sequence of values X to obtain a sequence of values $A=X+N^A$ where $N^A$ is a random sequence comprising receiver noise of the first apparatus;

receiving, by the second apparatus, the first signal comprising the sequence of values X to obtain a sequence of values $B=X+N^B$ where $N^B$ is a random sequence comprising receiver noise of the second apparatus, and where $N^A$ and $N^B$ are independent of each other;

transmitting, between the first and second apparatuses, one or more second signals for performing a data matching procedure to identify corresponding pairs of matching values, $a_i$, $b_i$, in respective sequences A* and B*, that match, wherein the sequences A* and B* are discrete-valued sequences equal to, derived from, or derived using, the sequences A and B that comprise the receiver noise of the first and second apparatuses, respectively, such that the sequences A* and B* also comprise the receiver noise of the first and second apparatuses, respectively;

wherein the shared secret information is equal to, or derived from, or derived using, matching values in discrete-valued sequences A* and B* that comprise the receiver noise of the first and second apparatuses, respectively.

2. The method of claim 1, wherein the data matching procedure comprises the steps of:

exchanging one or more messages between the first apparatus and the second apparatus, such that at least one of the first apparatus and the second apparatus acquires one or more acquired values, wherein at least one of the acquired values is equal to or derived from $a_i$, and at least one of the acquired values is equal to or derived from $b_i$; and performing, by at least one of the first apparatus and the second apparatus, one or more mathematical operations including a comparison operation, wherein matching of the values $a_i$, and $b_i$ is determined from a result of the comparison operation.

3. The method of claim 1, wherein the data matching procedure comprises performing, by an apparatus P being one of the first apparatus and the second apparatus, and an apparatus Q being other of the first apparatus and the second apparatus, the steps of:

transmitting, by apparatus P to apparatus Q, a value $T_1 = f_1(p)$, where p is a value in the sequence, A* or B*, of apparatus P and $f_1$ is a predetermined function;

comparing, by apparatus Q, $T_1$ or a value derived from $T_1$ with q or a value derived from q, where q is a value in the sequence, B* or A*, of apparatus Q corresponding in sequence position to p.

4. The method of claim 3, wherein the step of comparing comprises at least one of: comparing $T_1$ with $f_1(q)$; and comparing $f^{-1}_1(T_1)$ with q, where $f^{-1}_1$ is the inverse function of $f_1$.

5. The method of claim 1, wherein the data matching procedure comprises performing, by an apparatus P being one of the first apparatus and the second apparatus, and an apparatus Q being other of the first apparatus and the second apparatus, the steps of:

transmitting, by apparatus P to apparatus Q, a value $T_1 = f_1(p)$, where p is a value in the sequence, A* or B*, of apparatus P and $f_1$ is a predetermined function; and computing, by apparatus Q, a value $T_2 = f_2(T_1, q)$ where $f_2$ is a predetermined function and q is a value in the sequence, B* or A*, of apparatus Q corresponding in sequence position to p;

wherein the step of comparing comprises comparing, by at least one of the first apparatus and the second apparatus, $T_2$ with a predetermined value.

6. The method of claim 5, wherein $f_1(p) = p \oplus r$, where r is a random value and $\oplus$ denotes modulo-2 addition.

7. The method of claim 6, comprising the further step of transmitting, by apparatus P to apparatus Q, a value $T_3 = f_3(r)$, where $f_3$ is a predetermined function;

wherein $f_2(T_1, q) = T_1 \oplus q$, and wherein the step of comparing comprises comparing, by apparatus Q, $T_3$ with $f_3(T_2)$.

8. The method of claim 6, comprising the further step of transmitting, by apparatus Q to apparatus P, the value $T_2$, wherein $f_2(T_1, q) = f_3(T_1 \oplus q)$, where $f_3$ is a predetermined function; and wherein the step of comparing comprises comparing, by apparatus P, $f_3(r)$ with $T_2$.

9. The method of claim 1, wherein the data matching procedure comprises performing, by an apparatus P being one of the first apparatus and the second apparatus, and an apparatus Q being other of the first apparatus and the second apparatus, the steps of:

computing, by apparatus P, a bit value $m_1 = p_1 \oplus r$, where $p_1$ is a first bit of a value p in the sequence, A* or B*, of apparatus P, r is a random bit, and $\oplus$ denotes modulo-2 addition;

computing, by apparatus P, a bit value $m_2 = p_2 \oplus r$, where $p_2$ is a second bit of p;

transmitting, by apparatus P to apparatus Q, the bit values $m_1$ and $m_2$;

computing, by apparatus Q, a bit value $m'_1 = m_1 \oplus q_1$ where $q_1$ is a first bit, corresponding in bit position to $p_1$, of a value q in the sequence, B* or A*, of apparatus Q corresponding in sequence position to p;

computing, by apparatus Q, a bit value $m'_2 = m_2 \oplus q_2$ where $q_2$ is a second bit of q, corresponding in bit position to $p_2$;

comparing a value $m'_1 \oplus m'_2$ with 0.

10. The method according to claim 1, wherein the data matching procedure uses a sequence of random values $r_i$ corresponding respectively to pairs of values, $a_i$, $b_i$, in respective sequences A* and B*, and wherein the shared secret information is based on random values, $r_i$, corresponding to matching values $a_i$, $b_i$ in sequences A* and B*.

11. The method of claim 1, comprising the further step of encoding the sequence X into the first signal and transmitting the first signal;

wherein the values of the sequence X are encoded into quantum states of the first signal; and wherein the values of the sequence X are encoded into at least one of: an amplitude; and a phase of the first signal.

12. The method of claim 11, wherein the first signal is encoded and transmitted by one of: the first apparatus; and an apparatus other than the first and second apparatus.

13. The method of claim 11, wherein the step of receiving, by the second apparatus, the first signal to obtain the sequence of values B comprises detecting, by the second apparatus, the encoded values; and wherein the step of receiving, by the first apparatus, the first signal to obtain the sequence of values A comprises detecting, by the first apparatus, the encoded values.

14. The method of claim 1, wherein the sequence X comprises at least one of: a random sequence of values; a sequence of Gaussian distributed values; and a predetermined sequence of values.

15. The method of claim 1, comprising the further step of converting, by each of the first and second apparatus, the respective sequences A and B into corresponding discrete-valued sequences A* and B*.

16. The method of claim 15, wherein the step of converting the sequences A and B into the corresponding discrete-valued sequences A* and B* comprises the step of:
obtaining, by each of the first and second apparatus, a respective sequence of binary values, A* and B*, corresponding respectively to A and B, by applying a predetermined discretization operation to each continuous value, $a_i$, $b_i$, in sequences A and B to obtain corresponding binary values in sequences A* and B*, wherein the discretization operation maps ranges of continuous values to corresponding binary values.

17. The method of claim 1, comprising the further step of performing, by the first and second apparatus, an error correction procedure for increasing correlation between the sequences A* and B*.

18. The method of claim 17, wherein the step of performing the error correction procedure comprises the step of performing, by the first and second apparatus, error correction between each corresponding pair of values, $a_i$, $b_i$, in sequences A* and B*, for correcting errors of up to a predetermined size.

19. The method of claim 17, wherein the error correction procedure comprises the step of, for each pair of corresponding values, $a_i$, $b_i$, in sequences A* and B*, performing, the sub-steps of:
generating, by one of the first and second apparatus, error correction information based on the value $a_i$ or $b_i$, in the sequence A* or B* corresponding to the one of the first and second apparatus, and transmitting the error correction information to other apparatus of the first and second apparatus;
applying, by the other apparatus, the error correction information to a corresponding value $a_i$ or $b_i$, in the sequence B* or A* corresponding to the other apparatus.

20. The method of claim 1, comprising the further step of retaining one or more bits at predetermined bit positions in each value, $a_i$, $b_i$, in sequences A* and B*, and discarding remaining bits.

21. The method of claim 20, comprising the further step of repeating the data matching procedure using the values, $a_i$, $b_i$, comprising the retained bits.

22. The method of claim 21, comprising the further step of replacing each value, $a_i$, $b_i$, in sequences A* and B*, with a parity value derived from each value, $a_i$, $b_i$.

23. The method of claim 22, comprising the further steps of:
dividing parity bits of each sequence A* and B*, into sequential groups of p bits to form new values, $a_i$, $b_i$; and
repeating the steps of retaining one or more bits at predetermined bit positions in each value, $a_i$, $b_i$, in sequences A* and B*, and discarding remaining bits.

24. The method of claim 1 further comprising:
generating a secret key from the shared secret information;
encrypting a message with the secret key; and
transmitting the encrypted message with a transmitter.

25. The method of claim 1 wherein:
$N^A$ and $N^B$ are different.

26. An apparatus for obtaining shared secret information with another apparatus, the apparatus comprising:
a receiver for receiving a signal comprising a sequence of values X to obtain a sequence of values $A=X+N^A$ where $N^A$ is a random sequence comprising receiver noise of the apparatus;
a processor and memory for exchanging, with the other apparatus, one or more second signals for performing a data matching procedure to identify corresponding pairs of values, $\underline{a}_i$, $\underline{b}_i$, in respective sequences A* and B*, that match, wherein sequences A* and B* are discrete-valued sequences equal to, derived from, or derived using sequences A and B, wherein B is a sequence of values $B=X+N^B$ obtained by the other apparatus, prior to the data matching procedure by receiving, by the other apparatus, the first signal comprising the sequence of values X, and $N^B$ is a random sequence comprising receiver noise of the other apparatus, wherein $N^A$ and $N^B$ are independent of each other and the sequences A* and B* also comprise the receiver noise of the apparatus and the receiver noise of the other apparatus, respectively; and
wherein the shared secret information is equal to, or derived from, or derived using, matching values in sequences A* and B* that comprise the receiver noise of the apparatus and the receiver noise of the other apparatus, respectively.

27. An apparatus for obtaining shared secret information with another apparatus, the apparatus comprising:
a receiver for obtaining a sequence of values $A=X+N^A$, where X is a sequence of values, and $N^A$ is a random sequence generated by the apparatus comprising receiver noise of the apparatus;
a processor and memory for transmitting, between the apparatus and another apparatus, one or more signals for performing a data matching procedure to identify corresponding pairs of values, $\underline{a}_i$, $\underline{b}_i$, in respective sequences A* and B*, that match, wherein the sequences A* and B* are discrete-valued sequences equal to, derived from, or derived using, the sequence A and a sequence B, wherein B is a sequence of values $B=X+N^B$ obtained by the other apparatus, prior to the data matching procedure, and $N^B$ is a random sequence generated by the other apparatus comprising receiver noise of the other apparatus, wherein $N^A$ and $N^B$ are independent of each other, and the sequences A* and B* also comprise the receiver noise of the apparatus and the receiver noise of the other apparatus, respectively; and
wherein the shared secret information is equal to, derived from, or derived using, matching values in sequences A* and B* that comprise the receiver noise of the apparatus and the receiver noise of the other apparatus, respectively.

* * * * *